United States Patent
Sugimoto et al.

(10) Patent No.: US 8,243,087 B2
(45) Date of Patent: Aug. 14, 2012

(54) IMAGE PROCESSING APPARATUS DISPLAYING JOB PROCESSING CONDITIONS WITH EACH DISPLAY CONFIGURATION SELECTED FROM PLURAL TYPES

(75) Inventors: Yasuaki Sugimoto, Hachioji (JP); Masaki Kakutani, Hiratsuka (JP); Tsuyoshi Yoneyama, Toyokawa (JP)

(73) Assignee: Konica Minolta Business Technologies, Inc. (JP)

( * ) Notice: Subject to any disclaimer, the term of this patent is extended or adjusted under 35 U.S.C. 154(b) by 389 days.

(21) Appl. No.: 12/479,661

(22) Filed: Jun. 5, 2009

(65) Prior Publication Data

US 2009/0315904 A1 Dec. 24, 2009

(30) Foreign Application Priority Data

Jun. 19, 2008 (JP) .................. 2008-161016

(51) Int. Cl.
G09G 5/36 (2006.01)
(52) U.S. Cl. ....................................... 345/556
(58) Field of Classification Search .................. 345/556
See application file for complete search history.

(56) References Cited

U.S. PATENT DOCUMENTS

| | | | | |
|---|---|---|---|---|
| 5,748,200 A | * | 5/1998 | Funahashi | 345/556 |
| 2005/0007616 A1 | * | 1/2005 | Sugiyama et al. | 358/1.13 |
| 2005/0207776 A1 | * | 9/2005 | Nomura et al. | 399/79 |
| 2006/0107212 A1 | * | 5/2006 | Lovat et al. | 715/700 |
| 2007/0195386 A1 | * | 8/2007 | Shinohara et al. | 358/527 |

FOREIGN PATENT DOCUMENTS

| | | |
|---|---|---|
| JP | 10-271248 | 10/1998 |
| JP | 11-039124 | 2/1999 |
| JP | 2001-154773 | 6/2001 |
| JP | 2002-055807 | 2/2002 |
| JP | 2002-182871 | 6/2002 |
| JP | 3499527 | 2/2004 |
| JP | 2005-031500 | 2/2005 |
| JP | 2005-102001 | 4/2005 |
| JP | 2005-321590 | 11/2005 |
| JP | 2006-244275 | 9/2006 |

OTHER PUBLICATIONS

Translation of claims for 3499527.
Notification of Reasons for Refusal issued by JPO on Jun. 2, 2010, in connection with Appl. No. 2008-161016, 4 pgs.
Translation of a Notification of Reasons for Refusal issued by JPO on Jun. 2, 2010, in connection with Appl. No. 2008-161016, 5 pgs.

* cited by examiner

*Primary Examiner* — Edward Martello
(74) *Attorney, Agent, or Firm* — Squire Sanders (US) LLP

(57) ABSTRACT

An information processing apparatus including: a display section; a memory section which memorizes a display configuration for displaying each processing condition of a job on the display section, the display configuration having been selected from a plurality of display configuration types and set by being correlated with the each processing condition; and a control section which controls to display a plurality of processing conditions on the display section by utilizing the display configuration having been correlated with the each processing condition and memorized in the memory section.

13 Claims, 25 Drawing Sheets

FIG. 2

JOB HISTORY TABLE 30

| EXECUTION TIME | SETTING CONTENTS | | | | | | USER NAME |
|---|---|---|---|---|---|---|---|
| XXXX YEAR XXXX MONTH XXXX DAY | A | B | C | D | E | ... | X |
| XXXX YEAR XXXX MONTH XXXX DAY | F | G | H | I | J | ... | X |
| XXXX YEAR XXXX MONTH XXXX DAY | K | L | M | N | O | ... | X |
| XXXX YEAR XXXX MONTH XXXX DAY | P | Q | R | S | T | ... | X |
| XXXX YEAR XXXX MONTH XXXX DAY | U | V | W | X | Y | ... | X |
| ... | | | ... | | | | |

FIG. 3

HISTORY SCREEN

JOB HISTORY LIST OF MR. X
(JOB CAN BE SET UP BY SELECTING
PROCESSING CONDITIONS)   1/1

| NO. | SETTING CONTENTS | | | | |
|---|---|---|---|---|---|
| 1 | A | B | C | D | E |
| 2 | F | G | H | I | J |
| 3 | K | L | M | N | O |
| 4 | P | Q | R | S | T |
| 5 | U | V | W | X | Y |
| 0 | F | L | S | | |

RETURN  OK

DOUBLE-SIDED +2 IN 1

COMPOUND ICON DISPLAY CONFIGURATION
(FOURTH DISPLAY CONFIGURATION)

FIG. 6

HISTORY SCREEN
(DETAILED CHARACTER
DISPLAY CONFIGURATION)

| NO. | SETTING CONTENTS | | | | |
|---|---|---|---|---|---|
| 1 | IMAGE REPEAT | DOUBLE-SIDED READING ⇒ DOUBLE-SIDED PRINTING | | | |
| 2 | INTERNET FAX | [ADDRESS] M.KONICA@KONICAMINOLTA.JP | [READING MODE] FULL COLOR | [READING RESOLUTION] 600DPI x 600DPI | |

JOB HISTORY LIST OF MR. X
(JOB CAN BE SET UP BY SELECTING PROCESSING CONDITIONS)  1/1

0

RETURN  OK

FIG. 7

HISTORY SCREEN
(SIMPLIFIED CHARACTER
DISPLAY CONFIGURATION)

| NO. | SETTING CONTENTS | | | |
|---|---|---|---|---|
| 1 | REPEAT | DOUBLE-SIDED ⇒ DOUBLE-SIDED | | |
| 2 | INTERNET FAX | [ADDRESS] M.KONICA | [READING MODE] FULL COLOR | [READING RESOLUTION] 600DPI x 600DPI |

JOB HISTORY LIST OF MR. X
(JOB CAN BE SET UP BY SELECTING PROCESSING CONDITIONS)   1/1

56  0

RETURN   OK

FIG. 10

HISTORY SCREEN
(DISPLAY CONFIGURATION
CONVERSION SPECIFICATION)

| NO. | SETTING CONTENTS | | | |
|---|---|---|---|---|
| 1 | [DOCUMENT SIZE] A3 SEF | 2 IN 1 | [READING MODE] COLOR | |
| 2 | [FILE TRANSMISSION] E-MAIL | [FILE FORMAT] PDF | [READING SIZE] A3 SET | |
| 3 | [DOCUMENT SIZE] A4 LEF | DELETION OUTSIDE DOCUMENT | DOUBLE-SIDED READING | ⇒ DOUBLE-SIDED PRINTING |

JOB HISTORY LIST OF MR. X
(JOB CAN BE SET UP BY SELECTING PROCESSING CONDITIONS) 1/1

56 — 2

DISPLAY CONFIGURATION CONVERSION REQUEST | RETURN | OK

FIG. 11

HISTORY SCREEN
(DISPLAY CONFIGURATION·
CONVERSION SPECIFICATION)

| NO. | SETTING CONTENTS | | | |
|---|---|---|---|---|
| 1 | [DOCUMENT SIZE] A3 SEF | 2 IN 1 | [READING MODE] COLOR | |
| 2 | [FILE TRANSMISSION] E-MAIL | [FILE FORMAT] E-MAIL PDF | [READING SIZE] E-MAIL A3 SET | |
| 3 | [DOCUMENT SIZE] A4 LEF | DELETION OUTSIDE DOCUMENT | DOUBLE-SIDED READING | ⇒ DOUBLE-SIDED PRINTING |

JOB HISTORY LIST OF MR. X
(JOB CAN BE SET UP BY SELECTING PROCESSING CONDITIONS)  1/1

56 — 2

- 58a DETAILED CHARACTER DISPLAY
- 58b SIMPLIFIED CHARACTER DISPLAY
- 58c ICON DISPLAY
- 57 DISPLAY CONFIGURATION CONVERSION REQUEST
- 55 RETURN
- 54 OK 51  50(16)  52  53

FIG. 13

DISPLAY CONFIGURATION TABLE 40

| USER NAME | PROCESSING CONDITIONS | | | | | | | | | | |
|---|---|---|---|---|---|---|---|---|---|---|---|
| | A | B | C | D | E | F | G | H | I | J | |
| X | DETAILED CHARACTER | DETAILED CHARACTER | DETAILED CHARACTER | SIMPLIFIED CHARACTER | SIMPLIFIED CHARACTER | SIMPLIFIED CHARACTER | CHARACTER | CHARACTER | ICON | ICON | ... |
| Y | DETAILED CHARACTER | DETAILED CHARACTER | DETAILED CHARACTER | SIMPLIFIED CHARACTER | SIMPLIFIED CHARACTER | SIMPLIFIED CHARACTER | CHARACTER | CHARACTER | ICON | ICON | ... |
| Z | DETAILED CHARACTER | DETAILED CHARACTER | DETAILED CHARACTER | SIMPLIFIED CHARACTER | SIMPLIFIED CHARACTER | SIMPLIFIED CHARACTER | CHARACTER | CHARACTER | ICON | ICON | ... |
| ... | | | | | | | | | | | |

FIG. 22

JOB HISTORY LIST OF MR. X
(JOB CAN BE SET UP BY SELECTING PROCESSING CONDITIONS)   1/1

| NO. | SETTING CONTENTS |
|---|---|
| 1 | A B C D E F G H I J |

52

| NO. | A | B | C | D | E | F | G | H | I | J |
|---|---|---|---|---|---|---|---|---|---|---|
| 1 | A | B | C | D | E | F | G | H | I | J |

| | S1 | | | | | | S | | | |

USE FREQUENCY $\alpha$ = 30 TIMES  7 TIMES  11 TIMES  3 TIMES  1 TIMES  7 TIMES  5 TIMES  21 TIMES  27 TIMES  7 TIMES FUNCTIONAL IMPORTANCE $\beta$ = 0.5  0.9  1.0  1.0  1.0  1.0  1.0  0.8  0.8  1.0
(BASIC FUNCTION < APPLICATION FUNCTION)

CALCULATION VALUE $\gamma$ = 15  9.9  7.0  3.0  1.0  7.0  5.0  16.8  21.6  7.0
($\gamma = \alpha \times \beta$)

PRIORITY         3    4    5    9   10    5    8    2    1    5

DETERMINE WHETHER DISPLAY SATISFIES S1 <= S AFTER PERFORMING DISPLAY CHANGE FROM THE HIGH PRIORITY

CANDIDATE FOR ICON DISPLAY:      A

A: DOUBLE-SIDED READING =>
DOUBLE-SIDED PRINTING
B: STAPLE
C: FILE FORMAT (PDF)
D: DENSITY (DARK)
E: PRINT RESOLUTION (400DPI * 400DPI)
F: DELETION OUTSIDE DOCUMENT
G: CHARACTER/IMAGE
H: 2 IN 1
I: REPEAT
J: TRAY SIZE (B4)

IMAGE PROCESSING APPARATUS DISPLAYING JOB PROCESSING CONDITIONS WITH EACH DISPLAY CONFIGURATION SELECTED FROM PLURAL TYPES

CROSS REFERENCE TO RELATED APPLICATION

The present application is based on Japanese Patent Application No. 2008-161016 filed with Japanese Patent Office on Jun. 19, 2008, the entire content of which is hereby incorporated by reference.

BACKGROUND OF THE INVENTION

1. Technical Field

The present invention relates to an information processing apparatus, which displays a plurality of processing conditions in a job on a screen for displaying setting contents and a history of the job.

2. Description of Prior Art

In a copying machine or a multi function peripheral, the processing conditions (functions and the modes) of a job are displayed in characters and icons on a screen, which displays the setting contents and a history of the job.

For example, technology that displays a plurality of set processing conditions in characters onto a confirmation screen for verifying the setting contents of a copy job is disclosed in Unexamined Japanese Patent Application Publication No. 2005-31500 in written form is disclosed. Technology that displays a plurality of processing conditions (modes) in each copy job in characters when displaying a list of the history of the copy job set up and executed in a past is disclosed in Unexamined Japanese Patent Application Publication No. H10-271248. Technology that displays a plurality of processing conditions in each job in characters or displays by symbolizing them in one icon when displaying a list of the history of jobs under process or waiting to be processed is disclosed in Japanese Patent No. 3499527. Technology that briefly displays processing conditions (contents of processing operations) of a job in icons on a predetermined area (job list area) of a job status screen is disclosed in Unexamined Japanese Patent Application Publication No. 2001-154773.

When displaying the plurality of processing conditions in the job, each of the above-mentioned technology displays them only in characters or icons. A display in characters has an advantage of being easily comprehended since the name and contents of the processing conditions are concretely expressed with words. However, when the number of characters increases, there is a disadvantage that the processing conditions become hard to be read. A display in icons has an advantage of being legible since the processing conditions are briefly expressed with a picture (image drawing). However, in the case of processing conditions of low name recognition or low use frequency, there is a disadvantage that the processing conditions with low recognizability or low use frequency are harder to comprehend their contents from the icon. As described above, there are advantages and disadvantages in displaying the processing conditions in characters or in icons. Which processing condition is suitable for being displayed in characters or icons varies by the flexibility and recognizability of the processing condition (whether it is general or special), use frequency of a user, skill level and a preference of the display configuration. Therefore, in a display that inclines toward either a character or an icon, there is a problem that the display that is capable of being easily viewed and comprehended has not been provided for users.

An object of the present invention is to provide an information processing apparatus, which is capable of displaying a plurality of processing conditions in a job so that it is legible and easily comprehended, to solve the above-mentioned problem.

SUMMARY

Information processing apparatus reflecting at least one aspect of the present invention to achieve the above mentioned object are:

(1) An information processing apparatus including:
  a display section;
  a memory section which memorizes a display configuration for displaying each processing condition of a job on the display section, the display configuration having been selected from a plurality of display configuration types and set by being correlated with the each processing condition; and
  a control section which controls to display a plurality of processing conditions on the display section by utilizing the display configuration having been correlated with the each processing condition and memorized in the memory section.

(2) The information processing apparatus of described in (1), further including:
  a selection section which receives a selection of the processing condition, and a selection of the display configuration for the selected processing condition,
  wherein the control section correlates the selected display configuration with the processing condition selected through the selection section, and controls to memorize the selected display configuration correlated with the processing condition into the memory section.

(3) The information processing apparatus described in (1) or (2), wherein the plurality of display configuration types comprises a character display configuration which expresses the processing conditions in characters, and an icon display configuration which expresses the processing conditions in an icon.

(4) The information processing apparatus described in (3), wherein the character display configuration comprises a first character display configuration, and a second character display configuration which expresses the processing condition in characters more briefly than the first character display configuration.

(5) The information processing apparatus described in (3), wherein the icon display configuration includes a first icon display configuration which expresses one processing condition with one icon, and a second icon display configuration which expresses a combination of two or more of the processing conditions with one icon.

(6) The information processing apparatus described in any one of (1)-(5), wherein display sizes of at least two types of display configurations among the plurality of display configuration types corresponding to one of the processing conditions are different from each other,
  wherein in cases where the plurality of processing conditions are displayed on the display section, the control section determines whether or not it is possible to display all of the plurality of processing conditions to be displayed in a predetermined display area with the corresponding display configuration memorized in the memory section, and in cases where the control section determines it is not possible, the control section changes the display configuration to another display configuration for making a display size smaller, so as to be capable of displaying all of the plurality of processing conditions to be displayed in the predetermined display area, with respect to one or more processing conditions which has been determined out of the plurality of processing conditions to be displayed, based on a predetermined condition.

BRIEF DESCRIPTION OF THE DRAWINGS

These and other objects, advantages and features of the invention will become apparent from the following description thereof taken in conjunction with the accompanying drawings in which:

FIG. 2 illustrates an example of a configuration of a job history table related to the first embodiment of the present invention;

FIG. 3 illustrates a history screen displayed on an operation display section of the multi function peripheral of the first embodiment of the present invention;

FIG. 6 illustrates an example of the processing condition displayed in the detailed character display configuration on the history screen related to the first embodiment of the present invention;

FIG. 7 illustrates an example of the processing condition displayed in the simplified character display configuration on the history screen related to the first embodiment of the present invention;

FIG. 10 illustrates a history screen of the display configuration and a conversion specification displayed on the operation display section of the multi function peripheral related to the first embodiment of the present invention;

FIG. 11 illustrates a state in which a mode selection operation has been performed on the history screen of FIG. 10 and a conversion operation has been performed to an icon display configuration;

FIG. 13 illustrates an example of a configuration of a display configuration table related to the first embodiment of the present invention;

FIG. 22 illustrates an example of a case in which the priority order of the processing condition for changing the display configuration to the icon display configuration is determined based on the usage history and a functional importance of the processing condition;

DETAILED DESCRIPTION OF THE PREFERRED EMBODIMENTS

Hereafter, embodiments of the present invention will be described based on the drawings.

[First Embodiment]

Figure 1:
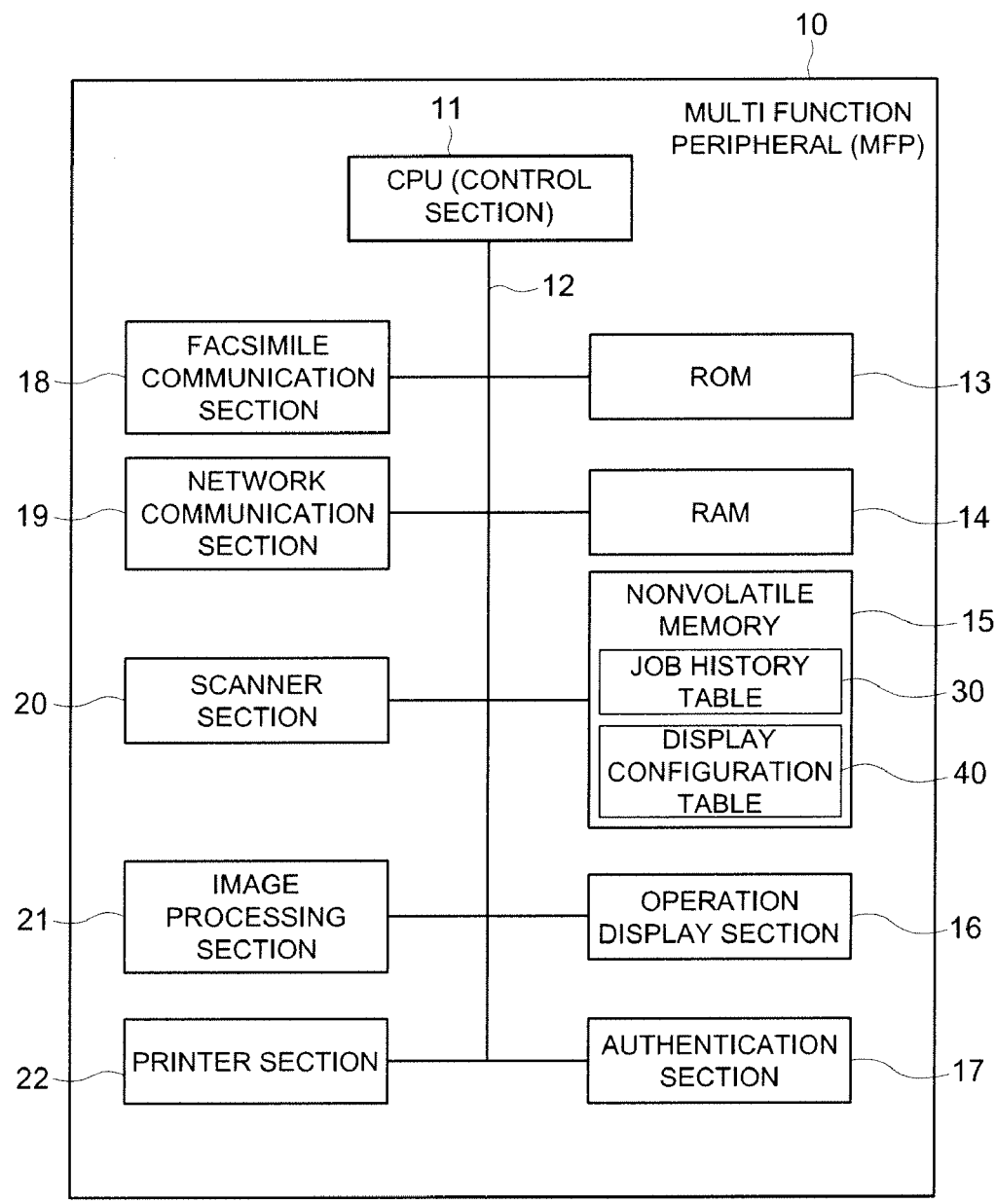
FIG. 1 illustrates a block diagram of a schematic configuration of a multi function peripheral being an information processing apparatus related to a first embodiment of the present invention.

FIG. 1 illustrates a schematic configuration of a multi function peripheral (MFP; Multi Function Peripheral/Multi Function Printer) 10 related to the first embodiment of the present invention. The multi function peripheral 10 is an apparatus (information processing apparatus) that includes a document copy function, a printer function, a scanner function, a facsimile function, an E-mail function (e-mail transmission and reception function) and a file transfer function. With respect to the facsimile function, the facsimile transmission and reception of scan data may be performed through a public line. Besides that, the facsimile function includes the Internet facsimile function (I-Fax function) that transmits and receives the scan data through the Internet by attaching the scan data to E-mail. The file transfer function includes a Scan to E-mail function that transfers the scan data by attaching the scan data to E-mail, a Scan to SMB (Server Message Block) function that transfers and stores the scan data onto a client terminal and a Scan to FTP (File Transfer Protocol) function that transfers and stores the scan data onto FTP server.

The multi function peripheral 10 is configured by connecting a ROM (Read Only memory) 13, a RAM (Random Access memory) 14, a nonvolatile memory 15, an operation display section 16, an authentication section 17, a facsimile communication section 18, a network communication section 19, a scanner section 20, an image processing section 21 and a printer section 22 to a CPU (Central Processing Unit) 11 being a control section via a bus 12.

The CPU 11 controls an operation of the multi function peripheral 10 based on the program stored in the ROM 13. The RAM 14 is used as a work memory, which temporarily stores various data when the CPU 11 executes a program. Further, the RAM 14 is used as the image memory for temporarily storing the image data. The nonvolatile memory 15 is a memory, which holds the memory even in case when a power supply is turned off. The nonvolatile memory 15 memorizes peculiar information and various setting information of an apparatus, user authentication information, displaying data for various screen displayed on the operation display section 16, a job history table 30 and a display configuration table 40 that will be described later.

The operation display section 16 functions as a display section for displaying various screens and as an operation section (selection section/registration section) for receiving various operations that a user performs towards the multi function peripheral 10. Here, the operation display section 16 includes a liquid crystal display, a touch panel provided on the screen and various kinds of switches.

The authentication section 17 authenticates a user based on authentication information, which is registered in advance by acquiring data for authentication. In this user authentication, various kinds of general-purpose authentication technology are used independently or in combination. For example, the various kinds of general-purpose authentication technology may be a card authentication technology for performing an identification authentication by verifying with the authentication information in which the data for authentication is memorized in IC (Integrated Circuit) card or ID (Identification) card is read and registered in advance, or a biometric authentication technology for performing an identification authentication by verifying with the authentication information in which the biometric information, such as finger print or finger vein, is read and registered in advance as the data for authentication.

The facsimile communication section 18 communicates through a public line with an external apparatus that is provided with a facsimile function. The network communication section 19 communicates with a terminal or a server, such as a personal computer, through a network, such as LAN (Local Area Network). The communication of the network communication section 19 includes a transfer of scan data by the transmission and reception of E-mail and a file transfer function (Scan to XXX function) by the Internet facsimile function.

The scanner section 20 acquires image data by optically reading a document. For example, the scanner section 20 may be configured by a light source for irradiating light onto a document, an image sensor for receiving the reflected light from the document and reading the document by one line in the width direction of the document, a scan mechanism for moving the position of the reading by the image sensor in line unit in the length direction of the document, and optical course including a mirror or lens that leads the reflected light from the document to the image sensor and forms an image. The image processing section 21 performs various image processes, such as image adjustment, rotation, expansion/reduction and compression/expansion, to the image data.

The printer section 22 prints an image that corresponds to inputted image data onto a sheet and outputs the sheet. For example, the printer section 22 may include a sheet conveyance apparatus, a photoreceptor drum, a charging device, a laser unit, a development device, a transfer separation apparatus, a cleaning device and a fixing device. Further, the printer section 22 may be configured as a laser printer that forms an image on a sheet with electrophotography process.

The CPU 11 reads information, which is memorized in screen display data and the job history table 30, out of the nonvolatile memory 15 by executing the program. Further, the CPU 11 displays various kinds of screens onto the operation display section 16. The various kinds of screens include a setting screen for setting up a job, a confirmation screen for confirming the setting contents of a job and a history screen for displaying the history of the job.

These screens may be independently displayed on the operation display section 16. A plurality of these screens may also be simultaneously displayed on the operation display section 16. In case when a plurality of these screens is displayed on the operation display section 16, for example, the setting screen and the confirmation screen may be displayed side by side, or the setting screen and the history screen may be displayed side by side. The display method of these screens may be predetermined in the initial setting, or may be switched by the operation of a user.

When the CPU 11 executes the program, the CPU 11 generates and executes a job set via the above-mentioned setting screen, the CPU 11 memorizes various information, which are for displaying the set (generated and executed) job history onto the history screen, into the job history table 30, and the CPU 11 displays setting contents of the past job onto the history screen using the various information read out from the job history table 30.

The setup of the job through the setting screen is performed when a user arbitrarily sets up a plurality of processing conditions displayed on the setting screen. The plurality of processing conditions that the user set up is displayed on the history screen as the setting contents of the past job.

The processing conditions of a job refer to each processing condition configuring the entire processing conditions that perform a series of processing of the job. Thus, the processing conditions of a job imply each mode and function. For example, with respect to the processing conditions of a copy job, the following conditions may exist (refer to FIG. 4, FIG. 11 and FIG. 18).

Document size mode: A3 Sef (Short Edge Feed; longitudinal direction sheet feed), or A4 Lef (Long Edge Feed; lateral direction sheet feed)
Single-sided/double-sided document mode: single-sided document, or double-sided document
Single-sided/double-sided print mode: single-sided printing, or double-sided printing
Reading mode: color (full color/auto color), or monochrome
Collective mode: 2 in 1, 4 in 1, 8 in 1, or N in 1
Document image quality mode: character, character/image, image or a map
Image repeat mode
Numbering mode The document size mode specifies the document size (fixed sizes, such as A3, A4, B4 and B5) and the sheet feed direction (longitudinal direction sheet feed or lateral direction sheet feed). The single-sided/double-sided document mode specifies the side of the document to be read (one side/both sides). The single-sided/double-sided print mode specifies the printing side of a sheet (one side/both sides). The reading mode specifies the color (color/monochrome) of when reading the document. The collective mode reduces and stores the document (document image) of a plurality of pages (two pages, four pages, eight pages and N pages) into one sheet and copies. The document image quality mode specifies the reading image quality of the document (document image). The image repeat mode reduces one page document (document image) and repetitively copies the image onto one sheet (a plurality of the document images is arranged and copied). The numbering mode prints consecutive numbers on the sheet onto which the document (document image) has been copied. The copy job generates a copy of the document by using these modes (function).

Although the detail will be described later, in this embodiment, the newly generated job (new job) can be set up using the setting (processing conditions) of the past job displayed on the history screen. The history screen also functions as the setting screen. Further, a display area for verifying the setting contents of the new job to which a setup is performed through the history screen is arranged on the history screen. This display area also functions as the above-mentioned confirmation screen.

When the CPU 11 executes the program, the CPU 11 receives a selection from the plurality of processing conditions in a past job displayed on the history screen, reflects the selected processing condition to the new job setting, and generates the new job that includes the selected processing conditions. Further, on the display of the past job in the above-mentioned history screen, a plurality of the processing conditions to be displayed is displayed on the display of the past job in the above-mentioned history screen in a display configuration that corresponds to the display configuration memorized in the display configuration table 40.

FIG. 2 illustrates an example of a configuration of the job history table 30.

The job history table 30 is a table in which various kinds of information related to the job set up by a user are registered. The various kinds of information registered onto the job history table 30 are used to display the history of the job and are also capable of being used for setting a new job. Execution time information, setting contents information and user name information are matched and registered onto the job history table 30 for each job.

The execution time information is time information (year/month/day/hour/minute) that the CPU 11 acquired from the clock section not illustrated at the time of job execution. The setting contents information indicates setting contents of a job. In detail, the setting contents information is information for individual processing conditions in the set job. For example, in case when the processing conditions were not set by a user, the default processing condition information is registered to the setting contents information. On the other hand, in case when the processing conditions were set by a user, the set processing condition information is registered to the setting content information. In FIG. 2, the processing condition information that was setup by a user is indicated as "A"-"Y".

The user name information is information (user ID information) that indicates the user name of the user (may be referred to as "authenticated user" hereinafter) who has performed a user authentication from the authentication section 17 and set the job. For example, a user name may be the user name registered to the job history table 30 in correspondence to the authentication information. When this user name information is matched up with the above-mentioned execution time information and setting contents information, and registered to the job history table 30, the job history table 30 memorizes and manages the setting contents (processing conditions) of the job, which were set by the authenticated user, for each user.

The CPU 11 creates a display table using the information (table information) registered in the above-mentioned job history table 30. Then the CPU 11 displays the history of the job set in a past onto the history screen of the operation display section 16 using the display table.

FIG. 3 illustrates an example of a history screen 50 displayed on the operation display section 16. The history screen 50 illustrated in FIG. 3 is displayed on the operation display section 16 using the display table created from the information registered in the job history table 30 illustrated in FIG. 2.

A screen name 51 is displayed on the upper section of the history screen 50. A job history display area 52 is arranged below the screen name 51. A new job setting verification area 53 is arranged below the job history display area 52. An OK button 54 and a RETURN button 55 are displayed in the lower section of the screen.

The screen name 51 indicates the name of the user (authenticated user) who has performed a user authentication and operates the multi function peripheral 10, and the name of the screen. For example, in case when Mr. X performs user authentication and operates the multi function peripheral 10, "Job History List of Mr. X" is displayed as the screen name 51.

The list of the history of the job, which was set up by the authenticated user in a past, is displayed on the job history display area 52. In detail, the setting contents of each job, which was set up by the authenticated user in a past, are arranged from the top to the bottom in the order of the newer execution time of the job to the older execution time of the job and are displayed on the job history display area 52. A plurality of processing conditions that indicates the setting contents is displayed in one row per job. In FIG. 3, the processing conditions are indicated as "A"-"Y".

As mentioned above, the multi function peripheral 10 has a function, which can reflect the processing conditions selected on the history screen 50 onto the setting of a new job. All of the above-mentioned processing conditions displayed on the job history display area 52 are capable of being individually selected and released. This selection/releasing is performed by pressing the display area of the processing conditions. The indication state of the selected processing condition changes to a state that indicates that the processing condition has been selected. In FIG. 3, the processing conditions, which are in non-selected state, are indicated without hatching, and the processing conditions, which are in selected state, are indicated with hatching. In this example, processing condition F, processing condition L and processing condition S are in the selected state.

The above-mentioned selected processing conditions are arranged and displayed on the new job setting verification area 53 in one row (one tier). In this example, the processing condition F, the processing condition L and the processing condition S are arranged and displayed in one row. The user is able to verify the setting contents of a new job 56 by viewing the processing conditions displayed in this new job setting verification area 53.

The OK button 54 receives an operation that confirms the setting of the new job 56. The RETURN button 55 receives an operation that cancels the setting of the new job 56 and returns the display of the operation display section 16 to the previous screen of the history screen 50.

In case when the OK button 54 is pressed while the setup (selection of processing conditions) of the new job 56 is being performed, a new job that includes the processing condition displayed on the new job setting verification area 53 is generated. At this time, the reflection of the setting for the new job with the selected processing conditions, for example, may be performed by copying the information of the selected processing condition onto the processing condition table of the new job. After one new job has been generated, the other new jobs may be repeatedly generated by repeating the same operations. In case when the RETURN button 55 is pressed while the setup (selection of processing conditions) of the new job 56 is being performed, the setting (generating) of the new job 56 is cancelled, and the display switches to the screen that is one before the history screen 50. Thus, the user selects a desirable processing condition out of the jobs, which the user has set up in a past and is displayed on the history screen 50. Then the user sets up the new job, and is able to generate and execute the new job.

Figure 4:
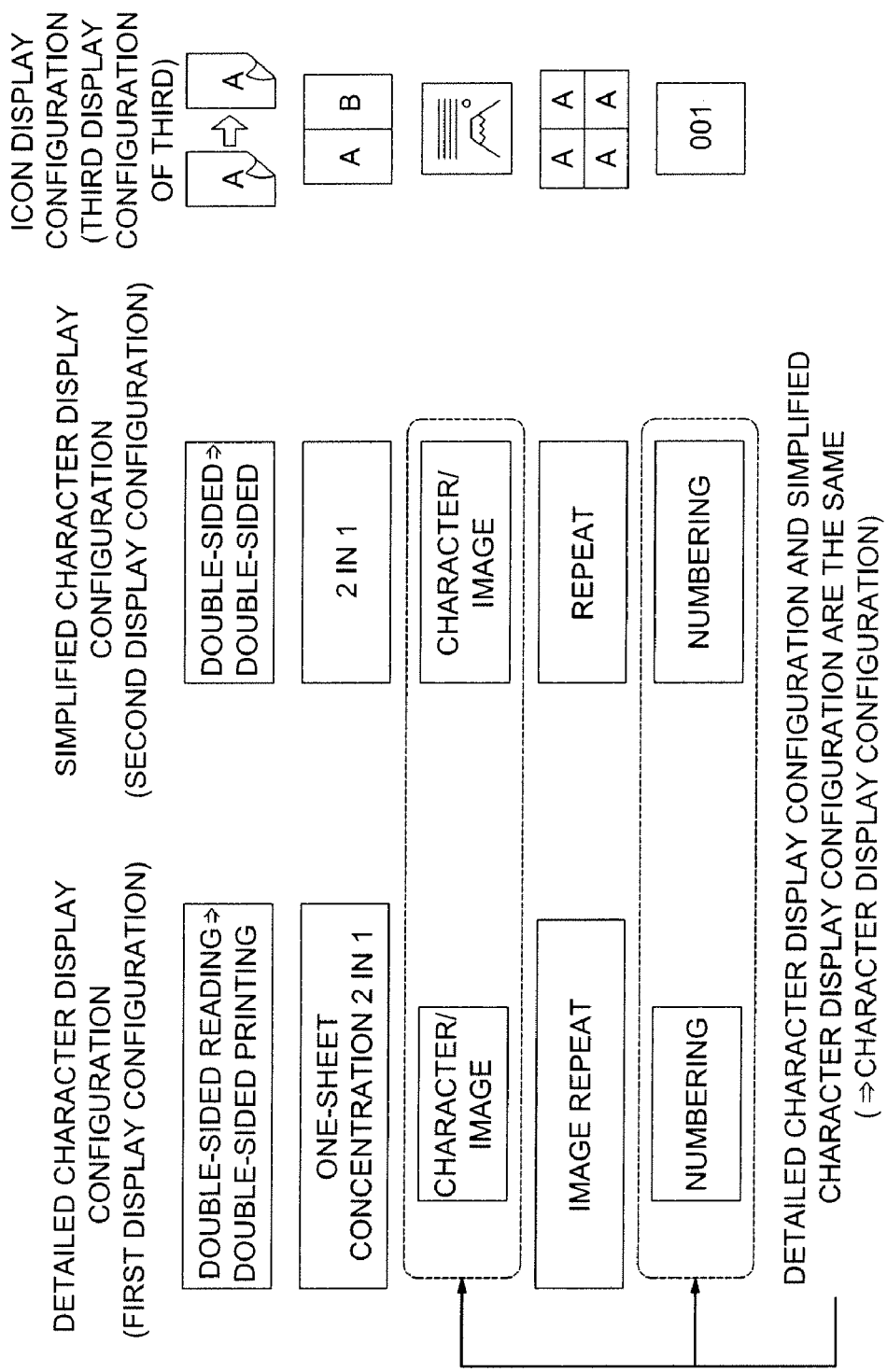
FIG. 4 illustrates an example of a display configuration (detailed character display configuration, simplified character display configuration and icon display configuration) of a processing condition displayed on the history screen related to the first embodiment of the present invention.

FIG. 4 illustrates an example of a display configuration of the processing conditions displayed on the history screen 50. Here, the display configurations of the double-sided document mode, a double-sided print mode, the 2 in 1 mode (collective mode), a character/image mode (document image quality mode), an image repeat mode and a numbering mode in a copy job will be described as an example.

According to this embodiment, a character display configuration, in which the processing condition is expressed in characters, and an icon display configuration, in which the processing condition is expressed in icons, are provided as the display configuration of the processing conditions. Depending upon the kinds of processing conditions, there is a case that the character display configuration is distinguished by a detailed character display configuration in which the processing condition is expressed more in detail with characters, and a simplified character display configuration in which the processing condition is briefly expressed with characters.

Concretely, the double-sided document mode and the double-sided print mode are provided in three kinds of display configuration: the detailed character display configuration (first display configuration (first character display configuration)); the simplified character display configuration (second display configuration (second character configuration)); and the icon display configuration (third display configuration (first icon display configuration)). In the detailed character display configuration, the double-sided document mode and the double-sided print mode are displayed as "double-sided reading=>double-sided printing" on the history screen 50. In the simplified character display configuration, the double-sided document mode and the double-sided print mode are displayed as "double-sided=>both sides" on the history screen 50. In the icon display configuration, an icon (image drawing) as illustrated in FIG. 4 is displayed on the history screen 50 as the double-sided document mode and the double-sided print mode.

Similarly, three kinds of display configurations are provided for the 2 in 1 mode. In the detailed character display configuration, "one-sheet collective 2 in 1" is displayed on the history screen 50. In simplified character display configuration, "2 in 1" is displayed on the history screen 50. In the icon display configuration, an icon as illustrated in FIG. 4 is displayed on the history screen 50. Similarly, three kinds of display configuration are provided for the image repeat mode. In the detailed character display configuration, "image repeat" is displayed on the history screen 50. In simplified character display configuration, "repeat" is displayed on the history screen 50. In the icon display configuration, an icon as illustrated in FIG. 4 is displayed on the history screen 50.

The character/image mode is provided with two kinds of the display configurations: a character display configuration and an icon display configuration. In the character display configuration, "character/image" is displayed on the history screen 50. In the icon display configuration, an icon as illustrated in FIG. 4 is displayed on the history screen 50. Similarly, two kinds of display configurations are provided for the numbering mode. In the character display configuration, "numbering" is displayed on the history screen 50. In the icon display configuration, an icon as illustrated in FIG. 4 is displayed on the history screen 50.

Figure 5:
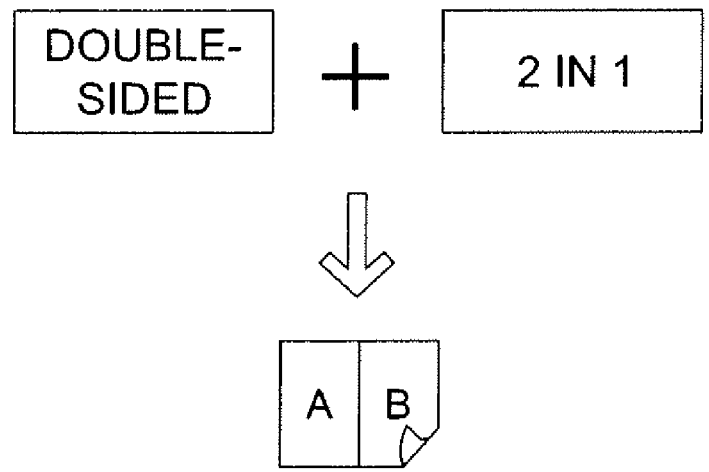
FIG. 5 illustrates an example of a display configuration (compound icon display configuration) of the processing condition displayed on the history screen related to the first embodiment of the present invention.

The icon display configuration illustrated in FIG. 4 expresses one processing condition in one icon. However, not less than two processing conditions may be combined and expressed in one icon. For example, the double-sided print mode ("both sides") and the 2 in 1 mode ("2 in 1") can be combined and expressed in one icon just as a compound icon display configuration (fourth display configuration (second icon display configuration)) illustrated in FIG. 5.

Each display data of the various kinds of display configuration provided for one processing condition and its processing condition are matched for each processing condition, registered to the processing condition display data table and memorized in the nonvolatile memory 15. The display configuration of when the processing condition is displayed on the history screen 50 is selected in advance from the various kinds of the display configurations that correspond to each processing condition and is set up. These display configurations and the processing condition, which were selected and set up for every processing condition, are matched up and are registered onto the display configuration table 40. The manufacturer of the multi function peripheral 10 may perform this selection and the setup of the display configuration for each processing condition in advance. Further, the multi function peripheral 10 may be set up so that an administrator may setup or change the setting from the administrator mode of the multi function peripheral 10.

When the CPU 11 displays the processing conditions to be displayed onto the job history display areas 52 and the new job setting verification area 53 of the history screen 50, the CPU 11 refers to the display configuration table 40 and reads out the display data of the display configuration that corresponds to the processing condition to be displayed. This display data is written into the previously mentioned display table. Then the processing condition to be displayed is displayed in the display configuration that was selected and set up in advance using the display table.

FIG. 6 illustrates an example of a display of the detailed character display configuration. FIG. 7 illustrates an example of a display of the simplified character display configuration.

In this example, a job 1 displayed on the history screen 50 is a copy job, and a job 2 displayed on the history screen 50 is the Internet facsimile job. In case when the processing conditions (image repeat mode, double-sided reading and double-sided print mode, Internet facsimile mode and address) in these jobs are set in the detailed character display configuration, they are displayed as illustrated in FIG. 6. In case when the processing conditions are set in the simplified character display configuration, they are displayed as illustrated in FIG. 7.

A user may perform the change of the setting (switching/conversion) to the display configuration of the processing conditions. For example, the user is able to change the settings via the user setting mode of the multi function peripheral 10 and the history screen 50.

Figure 8:
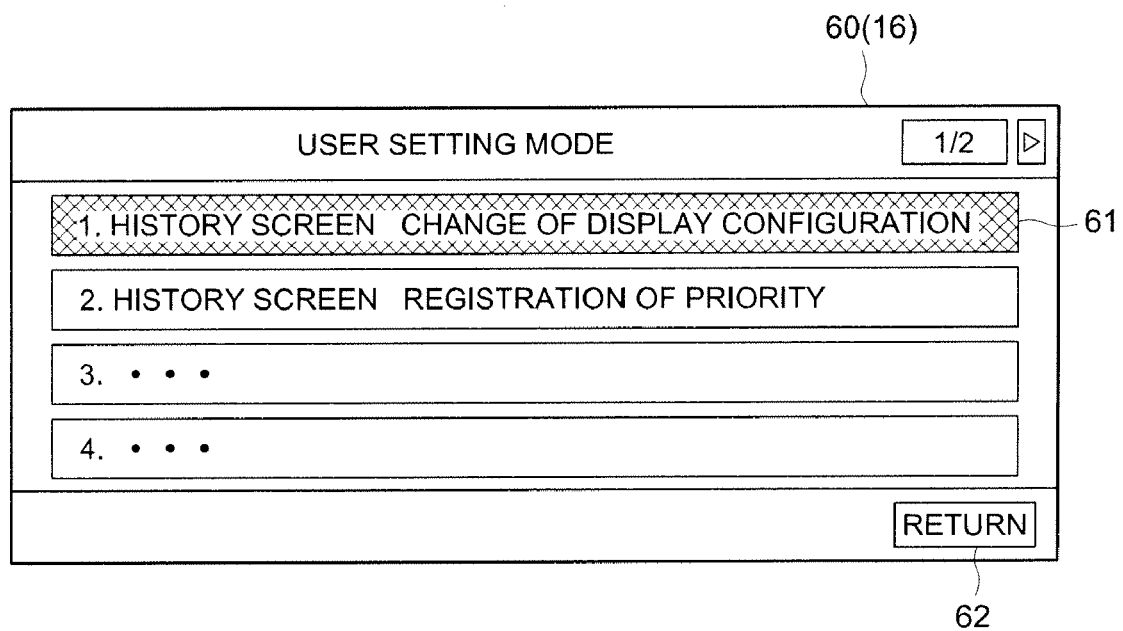
FIG. 8 illustrates a user setting mode screen displayed on the operation display section of the multi function peripheral related to the first embodiment of the present invention.
Figure 9:
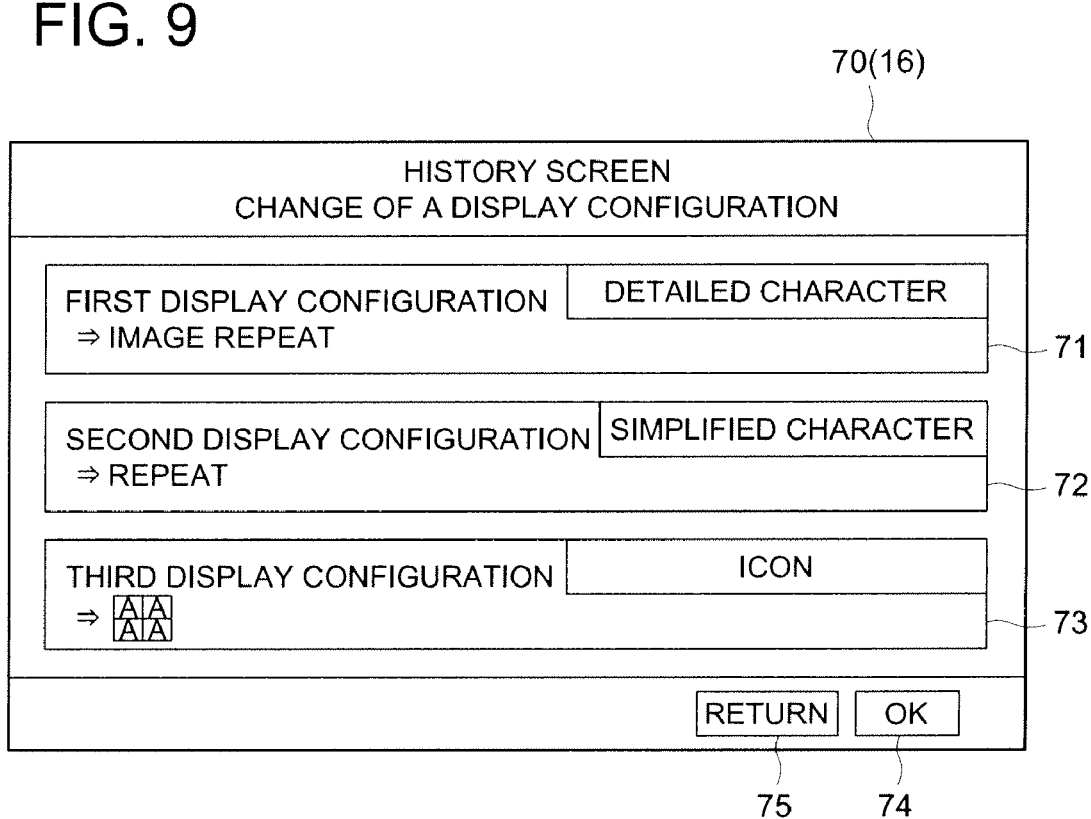
FIG. 9 illustrates a display configuration switching screen displayed on the operation display section of the multi function peripheral related to the first embodiment of the present invention.

FIG. 8 illustrates an example of a user setting mode screen 60 corresponding to the change of the display configuration by a user. FIG. 9 illustrates an example of a display configuration switching screen 70 for switching the display configuration.

When a predetermined button (hard key or soft key) in the operation display section 16 is pressed by a user, the CPU 11 of the multi function peripheral 10 displays the user setting mode screen 60 illustrated in FIG. 8. When a display configuration switching button 61 ("1, switching of display configuration of history screen" in FIG. 9) displayed on the user setting mode screen 60 is pressed, the CPU 11 of the multi function peripheral 10 displays the display configuration switching screen 70 illustrated in FIG. 9. When the RETURN button 62 displayed on the user setting mode screen 60 is pressed, the screen that had been displayed before the user setting mode screen 60 appears.

A detailed character selection button 71, a simplified character selection button 72, an icon selection button 73, an OK button 74 and a RETURN button 75 are displayed on the display configuration switching screen 70. This example illustrates the screen for switching the display configuration of the image repeat mode. However, the selection of the processing condition in which the display configuration will be switched may be performed separately. For example, when the display configuration switching button 61 of the user setting mode screen 60 is pressed, the selection screen for selecting the processing condition may be displayed. The display configuration switching screen 70 corresponding to the processing conditions selected on the selection screen may be displayed.

When the selection button corresponding to the desirable display configuration out of the detailed character, simplified character or icon is pressed by a user, the CPU 11 changes the display state of the selection button to the selected state. When the OK button 74 is pressed, the setting of the selected display configuration is confirmed. The information of the display configuration corresponding to the related processing condition memorized in the display configuration table 40 is rewritten. When the RETURN button 75 is pressed, the user setting mode screen 60 or the screen that was displayed before the user setting mode screen 60 appears.

The user is able to change the setting of a desired processing condition to a desired display configuration via this user setting mode screen 60 or the display configuration switching screen 70. The processing conditions in which the setting was changed will be displayed on the history screen 50 in the changed display configuration.

Figure 12:
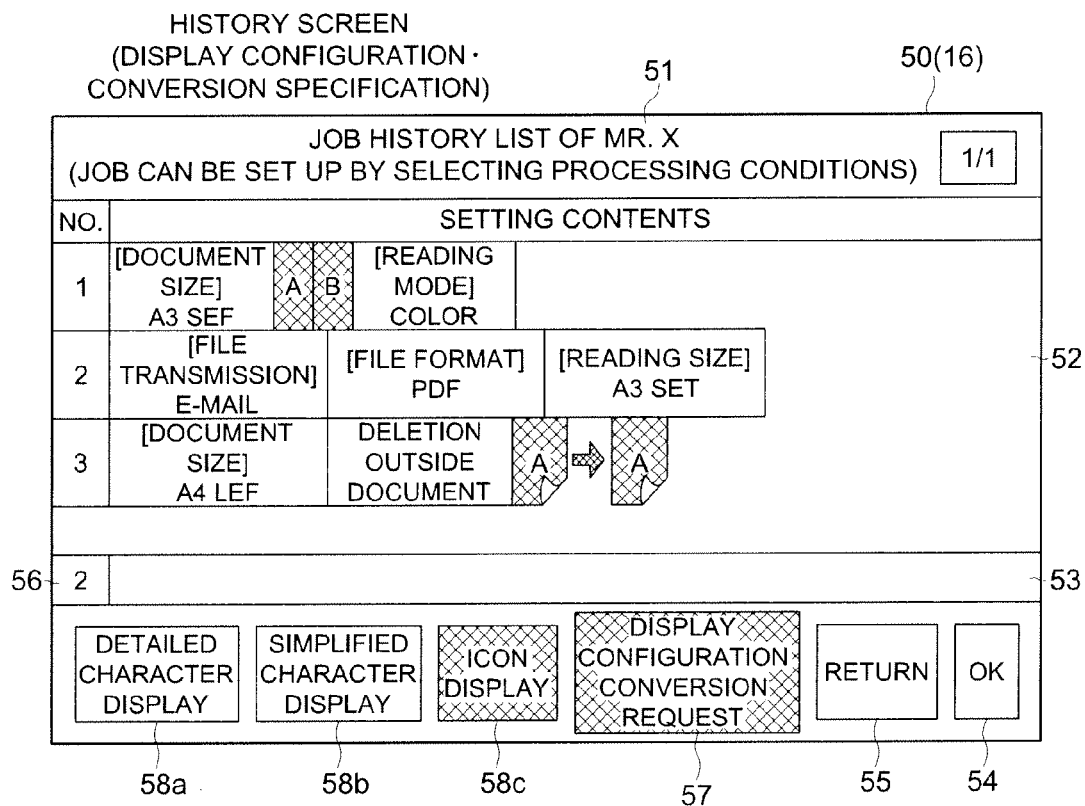
FIG. 12 illustrates a state in which the display configuration of the mode selected from the operation of the history screen of FIG. 11 is converted into the icon display configuration.

FIGS. 10 to 12 illustrate examples of the history screen 50 corresponding to a conversion of the display configuration by a user.

As illustrated in FIG. 10, a display configuration conversion demand button 57 is displayed in the lower section of this history screen 50 of display configuration and conversion specification. When the display configuration conversion demand button 57 is pressed, as illustrated in FIG. 11, the CPU 11 of the multi function peripheral 10 displays the detailed character display button 58a for changing the display configuration of the processing condition into the detailed character display configuration, the simplified character display button 58b for changing the display configuration of the processing condition into the simplified character display configuration and the icon display button 58c for changing the display configuration of the processing condition into the icon display configuration in the lower section of the history screen 50. When the processing conditions of a job displayed on the history screen are pressed and selected, and any one of the display buttons is pressed, the CPU 11 converts the display configuration of the selected processing condition to the display configuration that corresponds to the pressed display button. Further, the information of the display configuration corresponding to the related processing conditions memorized in the display configuration table 40 is rewritten.

In detail, when the processing conditions in the simplified character display configuration or the icon display configuration has been selected and the detailed character display button 58a is pressed, the display configuration of the selected processing conditions will be converted into the detailed character display configuration. When the processing conditions in the detailed character display configuration or the icon display configuration has been selected and the simplified character display button 58b is pressed, the display configuration of the selected processing conditions will be converted into the simplified character display configuration. When the processing conditions in the detailed character display configuration or the simplified character display configuration has been selected and the icon display button 58c is pressed, the display configuration of the selected processing conditions will be converted into the icon display configuration. In the processing conditions in which the display in the detailed character display configuration and the simplified character display configuration are the same just as in the character/image mode or the image repeat mode, the display configuration is converted to the icon display configuration from the character display configuration by pressing the icon display button 58c, and the display configuration is converted to the character display configuration from the icon display configuration by pressing the detailed character display button 58a or the simplified character display button 58b.

In FIG. 11, the 2 in 1 mode in the copy job of the job 1 is displayed in the simplified character display configuration, and the double-sided read-in and double-sided print mode in the copy job of the job 3 is displayed in the detailed character display configuration. FIG. 11 illustrates an example of a state in which these modes are selected and the icon display button 58c is pressed. The display configuration in each mode selected from this operation is converted into the icon display configuration, as illustrated in FIG. 12.

The user is able to select the desirable processing conditions and change the setting to the desirable display configuration via the above mentioned history screen 50 of the display configuration and the conversion specification. When the processing condition whose setting has been changed is displayed on the history screen 50 from then on, the processing condition will be displayed in the changed display configuration.

In case when the multi function peripheral 10 supports the change of the setting of the display configuration from a user, the setting contents of the display configuration are registered onto the display configuration table 40 for each user. FIG. 13 illustrates an example of a configuration of the display configuration table 40 memorized in the nonvolatile memory 15 in case when the user is able to change the display configuration of the processing conditions by performing the operations described in FIGS. 8 to 12.

The user name information, the processing condition information and the display configuration information are matched and registered onto this display configuration table 40. The user name information is information (user ID information), which indicates the user name of a user to whom the right of use of the multi function peripheral 10 is given. For example, the user name information is a user name registered in correspondence to the authentication information. The processing condition information is information, which indicates the processing condition of the job set in the multi function peripheral 10. In FIG. 13, the processing condition information is indicated as "A" to "J". The display configuration information is information, which indicates the display configuration of the processing conditions. In detail, the display configuration information is the information that indicates the detailed character display configuration (indicated as "detailed character" in FIG. 13), the information that indicates the simplified character display configuration (indicated as "simplified character" in FIG. 13), the information that indicates the character display configuration (indicated as "character" in FIG. 13) and the information that indicates the icon display configuration (indicated as "icon" in FIG. 13).

In case when the change of the setting of the display configuration is performed by the authenticated user, the CPU 11 rewrites the display configuration information of the processing conditions of the subject to be changed corresponding to the authenticated user to the changed display configuration information. The display of the processing conditions to be displayed onto the job history display area 52 or onto the new job setting verification area 53 in the history screen 50 of the authenticated user is performed based on the display configuration information registered in the display configuration table 40. In detail, the display configuration of the processing conditions to be displayed that corresponds to the authenticated user is determined with reference to the display configuration table 40. Then the processing conditions to be displayed are displayed in the determined display configuration.

Thus, in the multi function peripheral 10 related to this embodiment, in addition to preparing various kinds of the display configurations at the time of displaying the processing conditions onto the history screen 50 of the operation display section 16 for each processing conditions of the job, the display configuration, which was selected and set up from the various kinds of the display configurations, is correlated and registered onto the display configuration table 40, and memorized in the nonvolatile memory 15. For example, the processing conditions that have a low flexibility and a low recognizability are set up with the character display configuration (detailed/simplified character display configuration). The processing conditions that have a high flexibility and a high recognizability are set up with the icon display configuration. A plurality of processing conditions to be displayed in the job is displayed on the history screen 50 in the display configuration that is matched with each processing conditioned and memorized in the nonvolatile memory 15. Therefore, the processing conditions that have a low flexibility and a low recognizability are displayed in the character display configuration so that the processing conditions may be easily comprehended. The processing conditions that have a high flexibility and a high recognizability are displayed in the icon display configuration so that the processing conditions may easily be recognized.

Particularly in the case of the detailed character display configuration, since the processing conditions are expressed in detail with characters, the indication, which is easier to comprehend, can be performed. In case of the simplified character display configuration, since the processing conditions are simply expressed with characters, the processing conditions may be easily comprehended and displayed so that it is easily recognized. In the case of the icon display configuration illustrated in FIG. 4, since one processing condition is simply expressed with one icon, a legible indication can be performed. In the case of the compound icon display configuration illustrated in FIG. 5, two processing conditions are more briefly expressed with one icon.

In case when a user is able to change the setup of the display configuration, for example, the user can arbitrarily select the display configuration of the processing conditions with the use frequency and the skill level of the processing conditions, and the preference of the display condition for the processing condition. Thereby, a plurality of processing conditions to be displayed in the job can be displayed in the display configuration for each processing condition that suits the user and is legible and easy to understand.

[Second Embodiment]

Next, the second embodiment of the present invention will be described. The second embodiment relates to a response to a case in which a plurality of the processing conditions to be displayed in the job cannot be displayed with the display configuration set up for each processing condition onto the job history display area 52 or the new job setting verification area 53 of the history screen 50 described in the first embodiment.

Figure 14:
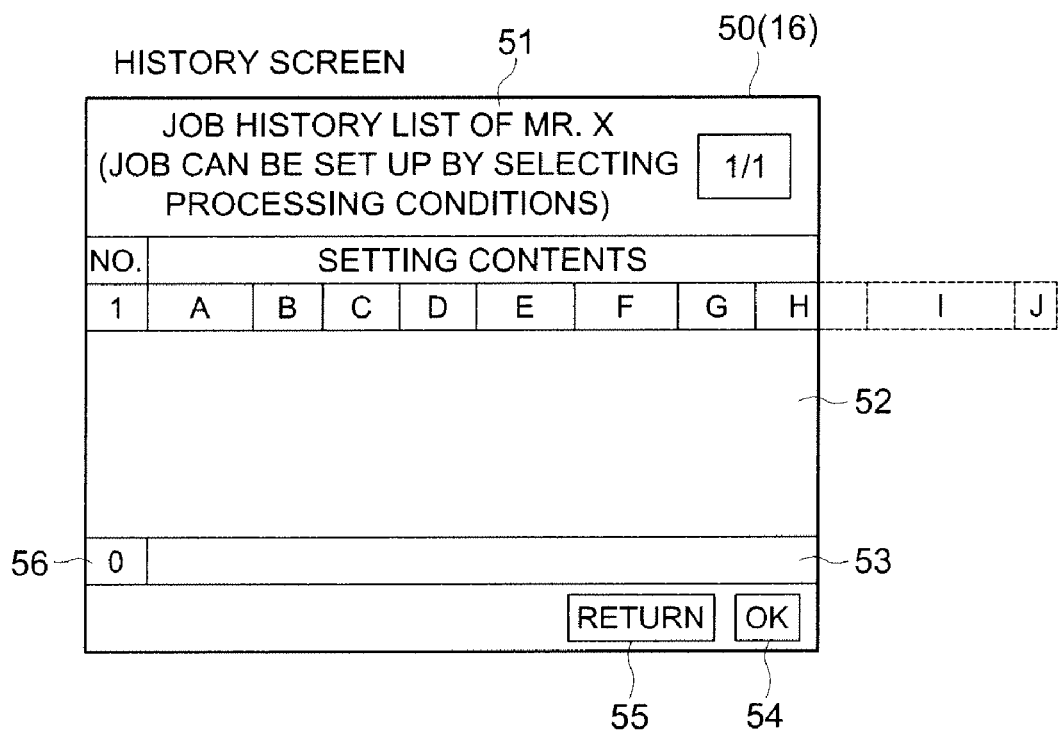
FIG. 14 illustrates an example of a state in which a plurality of processing conditions to be displayed in a job cannot be entirely displayed with each of set display configuration onto a job history display area of the history screen related to a second embodiment of the present invention.

FIG. 14 illustrates an example of when all of the plurality of the processing conditions to be displayed in the job 1 cannot be displayed on the job history display area 52 of the history screen 50 with the display configuration set up for each processing condition. As described in the first embodiment, the plurality of the processing conditions that indicates the setting contents of the job is arranged and displayed in one row (one tier) in the job history display area 52. Therefore, the size of the display area assigned for the display of the setting contents for one job has been decided. Similarly in the new job setting verification area 53, a plurality of the processing conditions that indicates the setting contents of the new job is arranged and displayed in one row (one tier). Therefore, the size of the display area assigned for the display of the setting contents for one job has been decided. Therefore, depending on the number of displays and the display size of the processing conditions, there may be a case in which all of the processing conditions may not be displayed at once.

FIG. 14 illustrates a state in which a processing condition I and a processing condition J are not displayed on the job history display area 52 in case when the processing conditions A to J of the job 1 are attempted to be displayed with the display configuration that was set up, because the processing conditions are cut off from the middle of a processing condition H. In such a case, the user needs to perform an operation, such as changing or scrolling the screen, in order to confirm the processing conditions that are not displayed. Since all processing conditions cannot be verified at once, the display becomes uneasy to view.

Then, in case when all processing conditions cannot be displayed, the display configuration may be changed to the other display configuration in which the display size of not less than one processing conditions out of the plurality of the processing conditions to be displayed is made smaller.

In detail, as illustrated in FIG. 4, in the 2 in 1 mode and the image repeat mode in the copy job, the size relation of the display size in a transverse direction is: (the detailed character display configuration)>(the simplified character display configuration)>(he icon display configuration). Accordingly, in case when the display configuration of these modes is set to the detailed character display configuration, the display configuration may be changed to the simplified character display configuration or the icon display configuration. In case when the display configuration is set to the simplified character display configuration, the display configuration may be changed to the icon display configuration. In the character/image or the numbering mode, the size relation of the display size is: (the character display configuration)>(the icon display configuration). Therefore, in case when the display configuration of these modes is set to the character display configuration, the display configuration is changed to the icon display configuration. In this embodiment, a case of changing the display configuration from the character display configuration (detailed/simplified character configuration) to the icon display configuration will be described.

The processing conditions for making the display size smaller will be determined based on the predetermined conditions. For example, the predetermined conditions may be a priority order determined by the comparison of the recognizability at the time of displaying the plurality of processing conditions to be displayed in the icon display configuration, a priority order determined by the comparison of the display size at the time of displaying the plurality of the processing conditions to be displayed in the icon display configuration, a priority order determined by the comparison of shortened amount or the shortening rate of the display size from changing the display configuration from the character display configuration to the icon display configuration, a priority order registered by the user and a priority order determined by the comparison of the past usage history of the plurality of processing conditions to be displayed. The multi function peripheral 10 determines the processing conditions whose display configuration will be changed from the character display configuration to the icon display configuration based on these priority orders.

Figure 15:
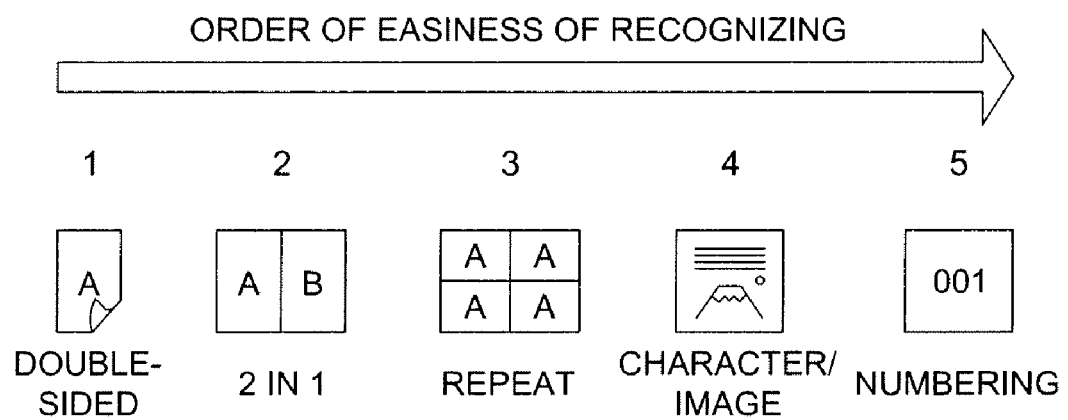
FIG. 15 illustrates an example of a case in which a priority order of the processing conditions for switching the display configuration to the icon display configuration is determined by comparing the recognizability of the icon display configuration.

FIG. 15 illustrates an example of a case in which the prioritization is performed by comparing the recognizability (discernment degree) at the time of displaying the processing conditions in the icon display configuration. Here, the icon display configuration of the double-sided mode (double-sided document mode/double-sided print mode), the 2 in 1 mode, the character/image mode, the image repeat mode and the numbering mode in the copy job described in the first embodiment will be described as the example.

With respect to each mode, the ease of recognitions in case when the processing conditions are displayed in the icon display configuration as illustrated in FIG. 15 are compared and the prioritization in the order of easy recognition will be performed. The easy recognition is based on the standard containing a subjective component. The prioritization may be based on the manufacturer's thoughts or based on the preference, such as the user's needs, fondness or familiarity that the maker is grasping.

In this example, the modes are prioritized in the order of easy recognition of icon as follows: the double-sided mode is the first; the 2 in 1 mode is the second; the image repeat mode is the third; the character/image mode is the fourth; and the numbering mode is the fifth. Such prioritization is performed. Then the priority table, in which the processing conditions and the priority order corresponding to the processing conditions are matched and registered, is memorized into the nonvolatile memory 15. An administrator may change this priority order from the administrator mode of the multi function peripheral 10.

Figure 16:
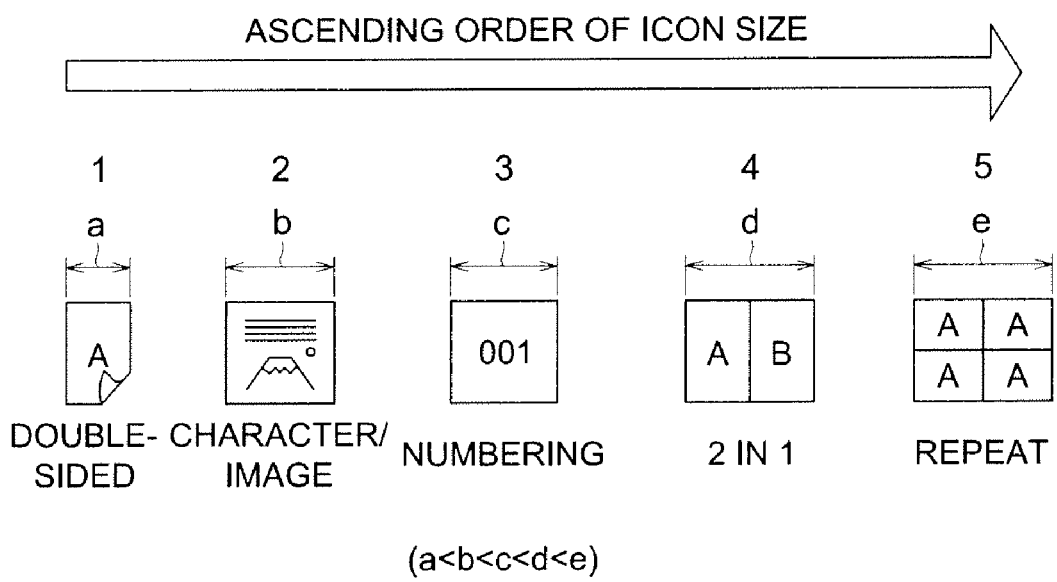
FIG. 16 illustrates an example of a case in which the priority order of the processing conditions for switching the display configuration to the icon display configuration is determined by comparing the display size of the icon display configuration.

FIG. 16 illustrates an example of a case in which the prioritization is performed by comparing the display sizes at the time of displaying the processing conditions in the icon display configuration.

In the icon display configuration of the double-sided mode, the 2 in 1 mode, the character/image mode, the image repeat mode and the numbering mode of the copy job, the size relation of the display size in the transverse direction is: [double-sided mode (a) <character/image mode (b) <numbering mode (c) <2 in 1 mode (d) <image repeat mode (e)]. The prioritization is performed in the ascending order of this icon size.

In this example, the modes are prioritized in the ascending order of the icon size: the double-sided mode is the first; the character/image mode is the second; the numbering mode is the third; the 2 in 1 mode is the fourth; and the image repeat mode is the fifth. Such prioritization is performed and the priority table, in which the processing conditions and the priority order corresponding to the processing conditions are matched and registered, is memorized into the nonvolatile memory 15.

The above-mentioned display size differs from the standard that contains the subjective component by the above-mentioned recognizability. The above-mentioned display size comes from the objective standard. With respect to such objective standard, the shortened amount (reduction amount) or the shortening rate (reduction rate) of the display size by changing the display configuration may be used besides the display size.

For example, in case when the objective standard is based on the shortened amount, the shortened amount is calculated by subtracting the display size of the display configuration after the change from the display size of the display configuration before the change. Then the shortened amount is prioritized in the descending order of the shortened amount. In case when the objective standard is based on the shortening rate, the shortening rate is calculated by dividing the display size of the display configuration after the change with the display size of the display configuration before the change. Then the shortening rate is prioritized in the descending order of the shortening rate. Here, the display configuration (display configuration set up) before the change is the character display configuration, and the display configuration after the change is the icon display configuration.

A plurality of priority tables of such objective standard or the above-mentioned priority table of the recognizability is memorized in the nonvolatile memory 15. Then the administrator may select a priority table to use out of those tables from the administrator mode in the multi function peripheral 10.

In case when all the processing conditions to be displayed of the job cannot be displayed on the job history display area 52 or the new job setting verification area 53 of the history screen 50, the CPU 11 of the multi function peripheral 10 changes the display configuration of the processing condition set up in the character display configuration (detailed/simplified character display configuration) to the icon display configuration in the order of the processing conditions having higher priority with reference to the priority table.

FIGS. 17 to 21 illustrate examples of a display screen in case when a user registers a priority order (setting change).

Figure 17:
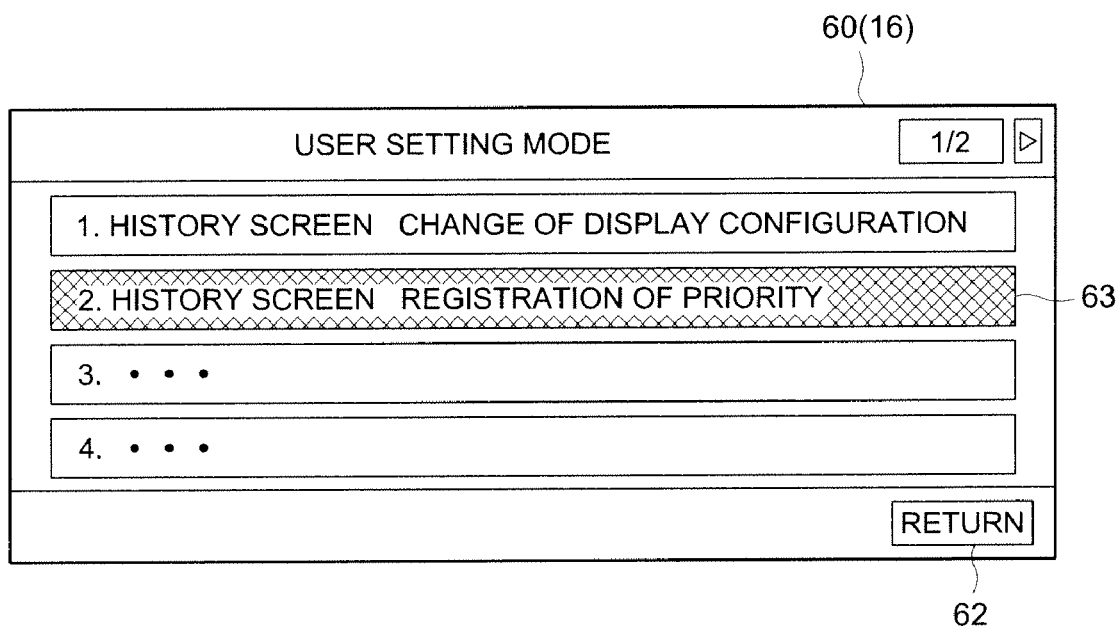
FIG. 17 illustrates a user setting mode screen displayed on the operation display section of the multi function peripheral related to the second embodiment of the present invention.
Figure 18:
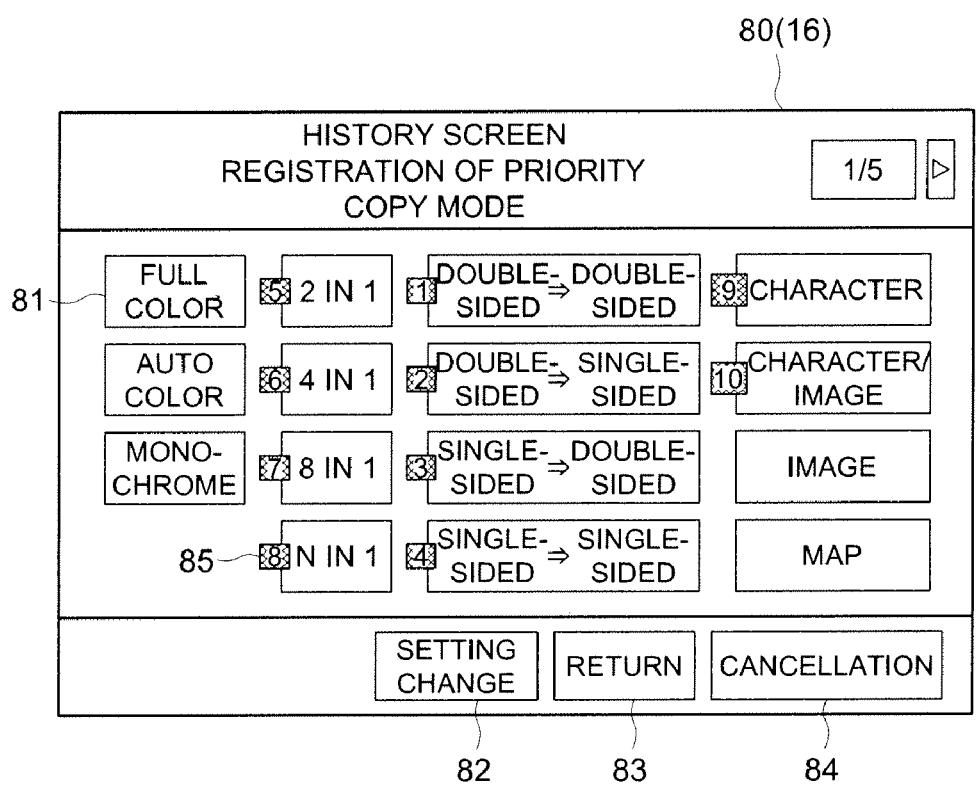
FIG. 18 illustrates a priority order registration screen displayed on the operation display section of the multi function peripheral related to the second embodiment of the present invention.

When the priority registration button 63 ("2, history screen priority registration" in the drawing) is pressed in user setting mode screen 60 shown in FIG. 17 explained in the first embodiment, the CPU 11 of the multi function peripheral 10 will display a priority registration screen 80 shown in FIG. 18 onto the operation display section 16.

A plurality of mode buttons 81 for indicating each mode (processing condition) provided in the copy mode, a setting change button 82, a returning button 83 and a cancel button 84 are displayed on the priority registration screen 80. The priority order 85, which makes a change to an icon display configuration, is added and displayed on the mode button 81. The priority order 85 is a priority order registered in advance by the manufacturer. For example, the priority order 85 is a priority order, which is determined based on the comparison of the recognizability of the described icon display configuration. The number of the modes, which perform prioritization, can be arbitrarily set. The prioritization may be performed for all the modes, or may be performed for a part of the modes having higher priority (the first to the tenth modes).

In this example, the double-sided document/double-sided print mode is to be the first; the double-sided document/single side print mode is to be the second; the single side document/double-sided print mode is to be the third; the single-sided document/single-sided print mode is to be the fourth; the 2 in 1 mode is to be the fifth; the 4 in 1 mode is to be the sixth; the 8 in 1 mode is to be the seventh; the N in i mode is to be the eighth, character mode is to be the ninth; and the character/image mode is to be the tenth.

Figure 19:
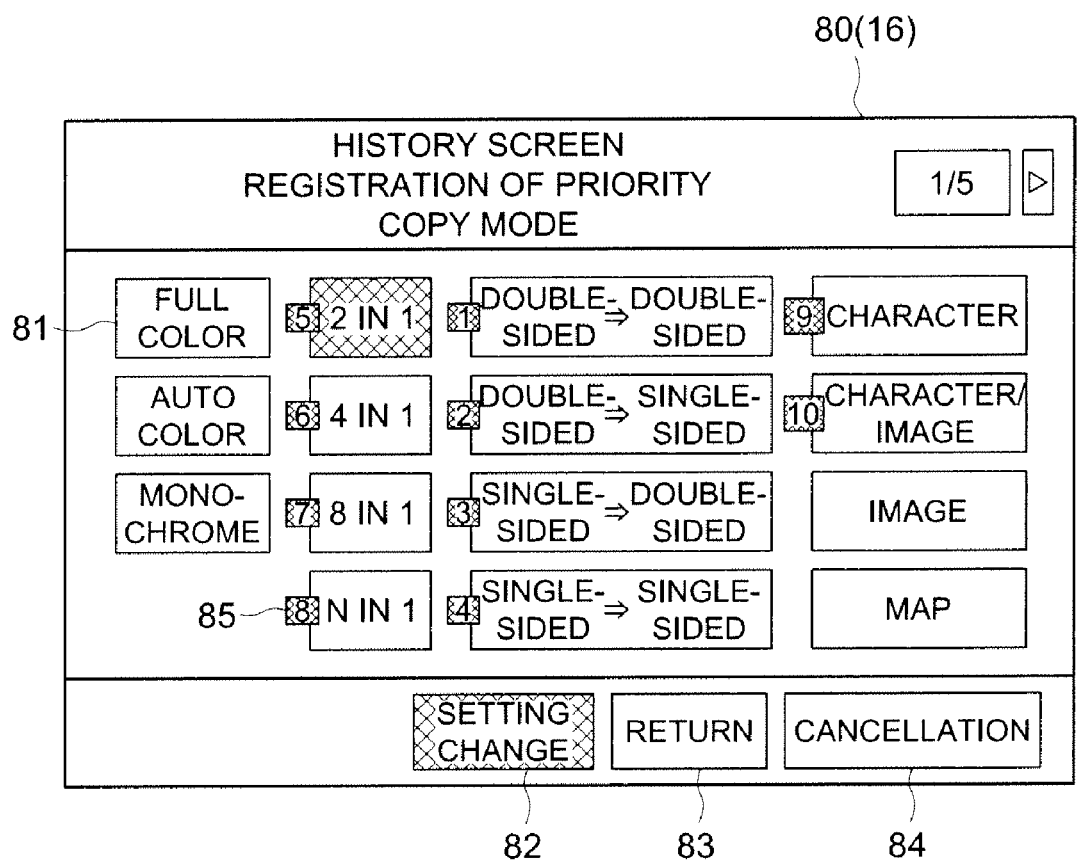
FIG. 19 illustrates a state in which a changing operation of the priority order has been performed in the priority registration screen of FIG. 18.
Figure 20:
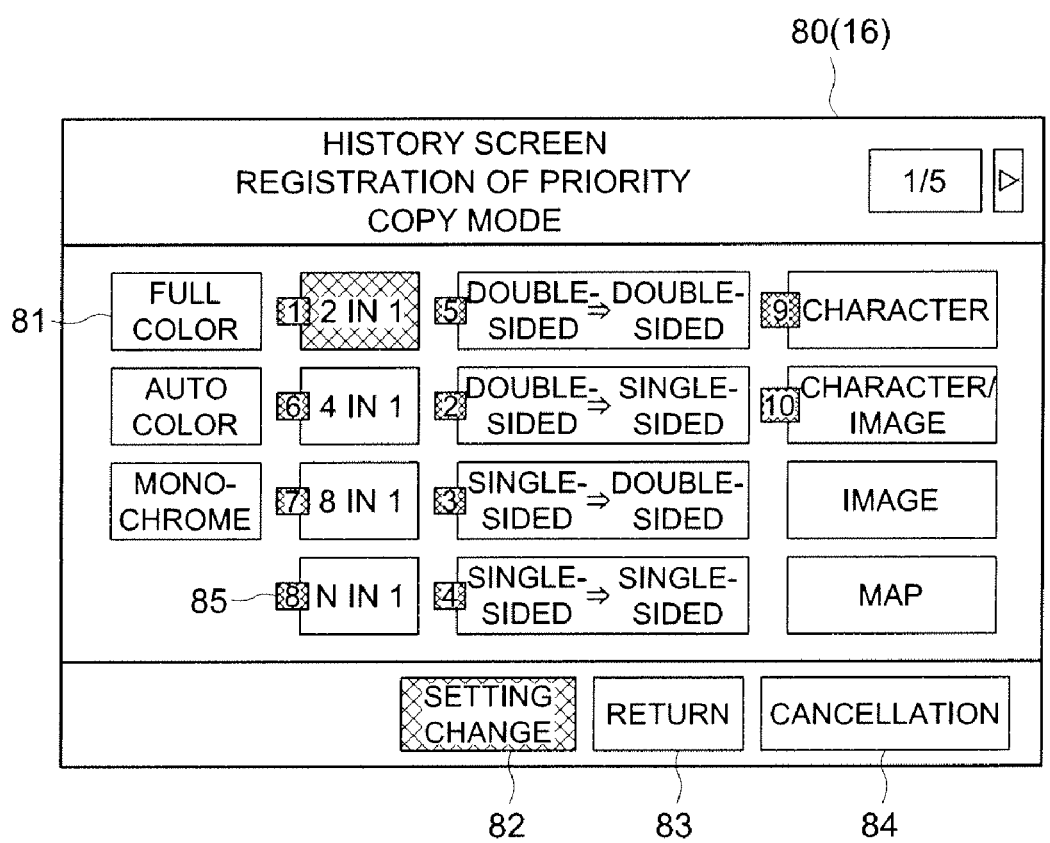
FIG. 20 illustrates a state in which the priority order of the mode that received the changing operation by the priority registration screen of FIG. 19 has been changed.

In a case where changing the priority order, the mode button 81 in the corresponding mode is pressed to perform the mode selection, and the priority order to be changed is inputted by pressing the setting change button 82 and ten keys (not illustrated). For example, in the case where the 2 in 1 mode is changed to the first from the fifth (current priority), as shown in FIG. 19, the mode button 81 is pressed to select the 2 in 1 mode. Then pushing the setting change button 82, and inputting "1" from the ten key. By this operation, the priority order of the 2 in 1 mode is replaced with the priority of the double-sided document/double-sided print mode having the first priority, and the priority of 2 in 1 mode becomes the first priority. In priority registration screen 80, as shown in FIG. 20, the "1" that indicates the first priority is additionally indicated onto the mode button 81 of the 2 in 1 mode. The "5" that indicates the fifth priority is additionally indicated onto the mode button 81 of the double-sided document/double-sided print mode.

Figure 21:
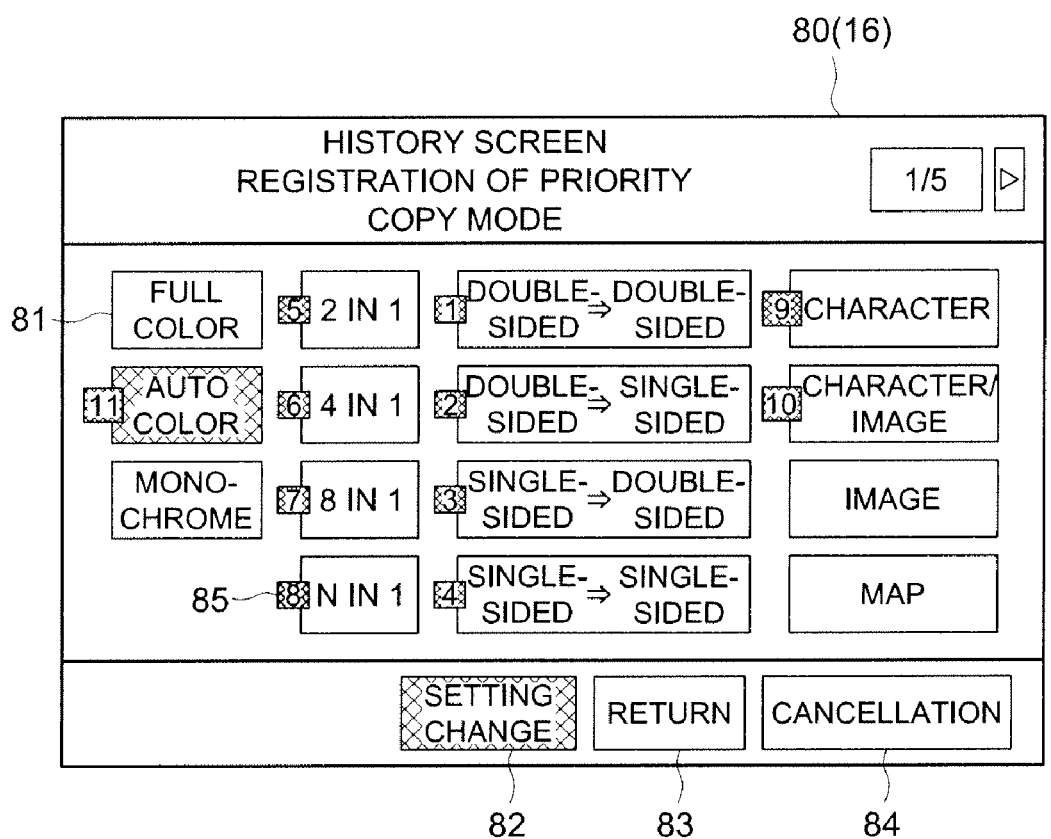
FIG. 21 illustrates a state in which the priority order has been added and registered to the mode that received the additional registration operation of the priority order from the priority registration screen of FIG. 18.

In case where performing additional registration of a priority order, the mode button 81 pertaining to the mode is pressed to select the mode, the setting change button 82 is pressed and the priority to be added is inputted with a ten key. For example, in case where performing additional registration of an auto color mode onto the eleventh priority, the mode button 81 of the auto color mode is pressed to select the auto color mode, the setting change button 82 is pressed, and the "11" is inputted with a ten key. Additional registration of the auto color mode onto the eleventh priority is performed by this operation. On the priority registration screen 80, as shown in FIG. 21, the additional indication of the "11" that indicates the eleventh priority is given to mode the button 81 of an auto color mode.

When the cancel button 84 is pressed, fro example, the settings of the priority change and additional registration that have been performed will be canceled, and the setting will return to the previous setting. Pressing the returning button 83 will display a screen that had been displayed just before the user setting mode screen 60 or the user setting mode screen 60.

Thus, when the priority order registration (setting change) is performed by a user, the CPU 11 in the multi function peripheral 10 creates and memorizes a priority table dedicated for the user into the nonvolatile memory 15. For example, the priority table dedicated for the user may be a priority table to which a processing condition and the priority order corresponding to the processing condition that have been correlated are registered, and to which the user identification information including user name information is added. And in the case where all processing conditions to be displayed of the job cannot be displayed on either the job history display area 52 of the user's history screen 50, or the new job setting verification area 53, the processing conditions set in the detailed character display configuration (details/simplified character display configuration) is changed into the icon display configuration in the order from the high priority processing condition with reference to the user's priority table.

FIG. 22 illustrates an example in a case of determining a priority order by comparing the usage history in a past of the plurality of the processing conditions to be displayed. In this example, the priority order is determined based on the usage history (use frequency or number of times of use) and importance (functional importance) of the processing conditions.

The use frequency ($\alpha$) is the number of times for which a user used the processing condition at a predetermined period of time (user factor). The number of times of use of the processing condition in this predetermined period of time is counted and held for each processing condition. The predetermined period of time can be set to an arbitrary period, such as the latest one month, a half year and one year. Instead of this use frequency, it is possible to use the number of times of use (for example, the sum total of the number of times that the processing condition was used during the entire period from the time that the user registration has been performed for the multi function peripheral 10 to the present time).

A functional importance ($\beta$) is a weight factor for every processing condition corresponding to the functional importance, and is a weight, which a manufacturer arbitrarily (subjectively) has set up (a manufacturer factor). For example, in a case where classifying a general-purpose function into a basic function and classifying a function having a lower general-purpose degree than the basic degree into an application function from a basic function, the basic function is considered to have a higher name recognition (the degree of widely known) than the application function. Therefore, the necessity to display the processing conditions in the character display configuration is low. That is, the priority order of changing display into the icon display configuration may be made higher. Thus, the weight factor of the basic function is made light (the priority of changing display into the icon display configuration: high), and the weight factor of the application function is made heavy (the priority of changing display into the icon display configuration: low).

A calculation value ($\gamma$) is calculated for every processing condition by the following formula (1) from above-mentioned use frequency ($\alpha$) and the functional importance ($\beta$), and prioritization is performed in descending order of the calculation value $$(\gamma) \cdot \gamma = \alpha \times \beta \qquad (1)$$

And changing display into the icon display configuration is performed in order from the processing conditions having a higher priority until the sum total of the display size (S1) obtained by adding the display size of each processing condition to be displayed on the job history display area 52 of the history screen 50 turns into equal to or less than the size (S) of the job history display area 52.

The job 1 displayed on the history screen 50, which is before display change shown in FIG. 22, is a job including processing conditions A-J described in FIG. 14. When displaying the display configuration according to the setup, the processing condition H is cut off from the middle portion of the processing conditions H and overflows as mentioned above.

For example, the processing conditions A-J are the following modes, and it is assumed that all are set as the detailed character display configuration.

A: Double-sided reading=>double-sided printing
B: Staple
C: File format (PDF)
(PDF; Portable Document Format (registered trademark))
D: Density (deep)
E: Print resolution (400 dpi*400 dpi)
(dpi; dot per inch)

F: deletion outside document
G: character/image
H: 2 in 1
I: Repeat
J: tray size (B4)

In a case where use frequency (α) and the functional importance (β) of the processing conditions A-J are just like a relationship shown in FIG. 22, the calculation value (γ) and the priority order become just like the illustration. Here, three processing conditions having high priority, the first processing condition I, the second processing condition H and the third processing condition A are changed into the icon display configuration in this example, and when S1≦S, these processing conditions become the processing conditions whose display configuration is to be changed (candidates for icon displays). Thus, when processing conditions whose display configuration is to be changed are determined and the display change has been performed, all the processing conditions A-J will be arranged to be displayed in the history screen 50 without overflowing as shown in the history screen 50 after the display change.

Figure 23:
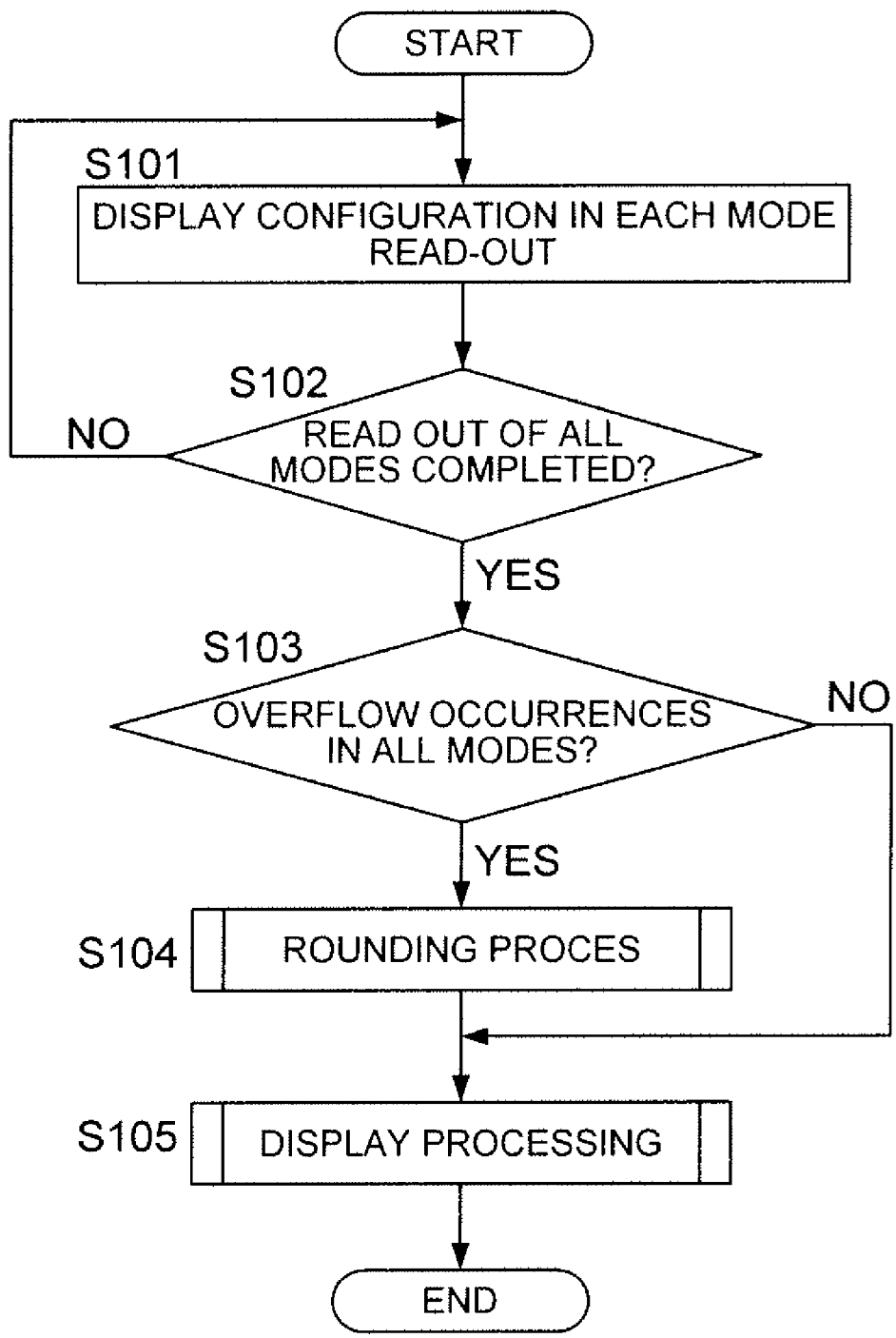
FIG. 23 illustrates a flow chart showing the job history display process performed by the multi function peripheral related to the second embodiment of the present invention.
Figure 24:
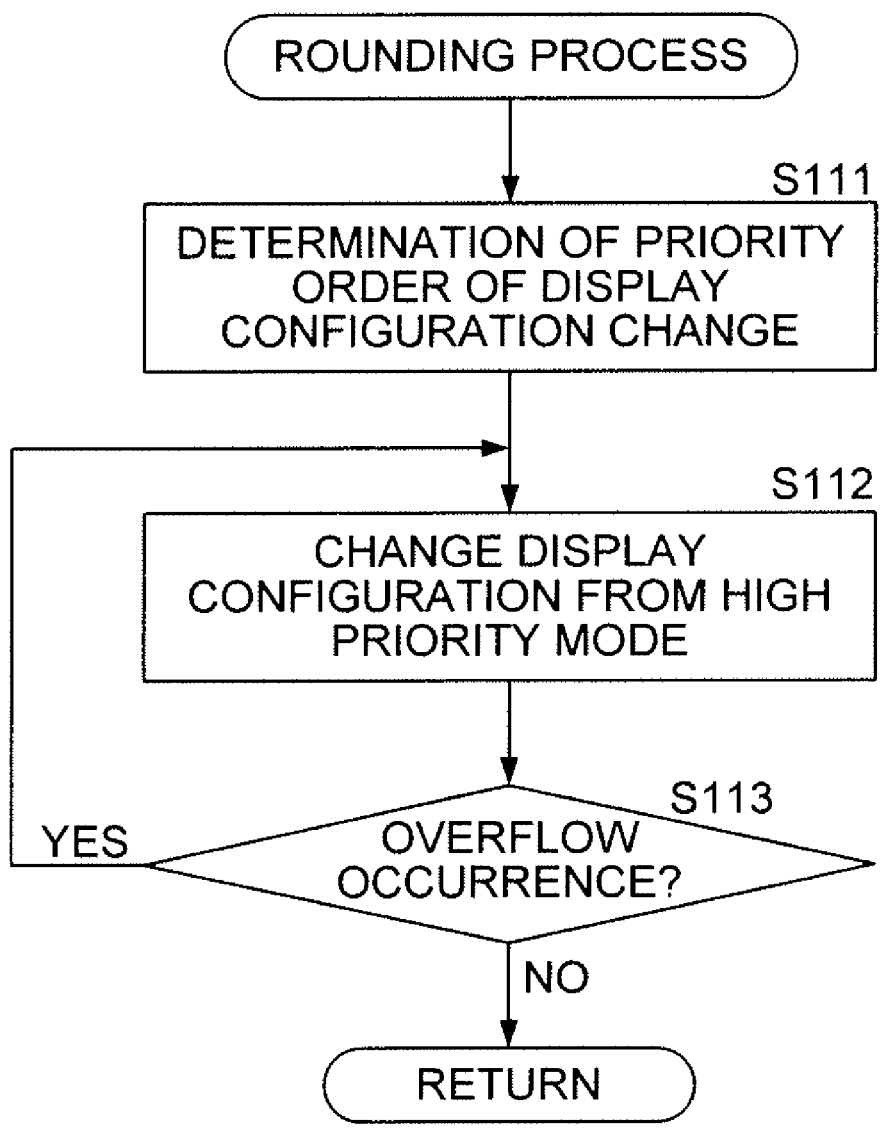
FIG. 24 illustrates a flow chart showing a rounding process of the job history display process of FIG. 22.
Figure 25:
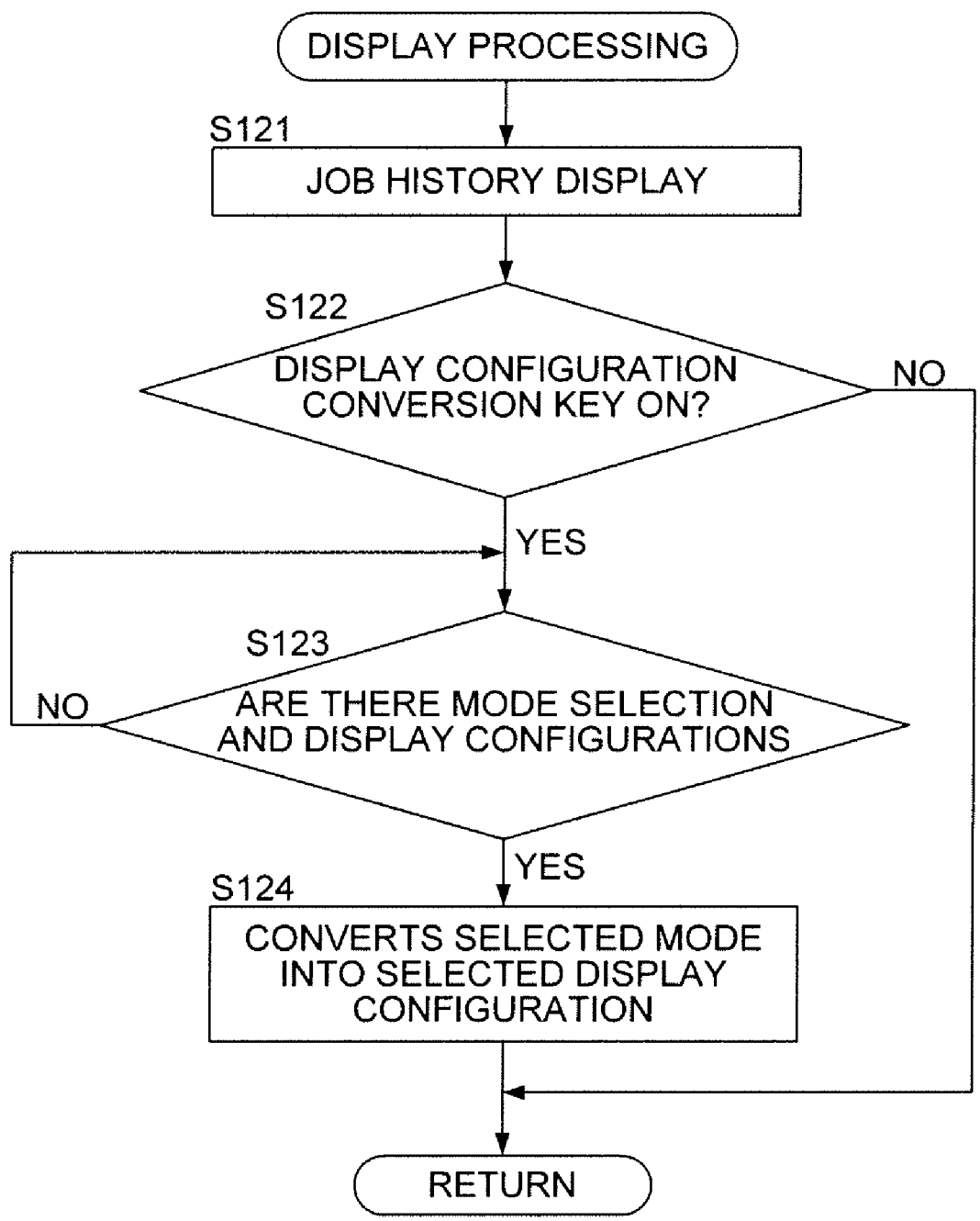
FIG. 25 illustrates a flow chart of a display process of the job history display process of FIG. 22.

Next, the contents of the job history display processing, which is performed by the multi function peripheral 10, will be descried based on a flow chart shown in FIGS. 23-25. Here, the processing contents in which the conversion of a display configuration by a user that has been described in FIGS. 10-12 in the first embodiment has been added to the change of the display configuration based on the priority order described in this embodiment of the present invention will be described as an example. In a flow chart, "processing conditions" used in the explanation of the following processing contents will be expressed as a "mode"

FIG. 23 illustrates a job history display processing that the multi function peripheral 10 performs. The CPU 11 will start this processing when a display operation of the history screen 50 is received from an authenticated user through the operation display section 16 of the multi function peripheral 10 (Start). Then, setting contents information and its execution time information of the job corresponding to the authenticated user are read from the job history table 30 (refer to FIG. 2), and display configuration information of each processing condition (each mode) corresponding to the authenticated user is read from the display configuration table 40 (refer to FIG. 13) (STEP S101). Read-out of the display configuration information is performed with respect to all the processing conditions (all the modes) included in the setting contents information (STEP S102; No—STEP S101).

When the read-out of the display configuration information for all the above-mentioned processing conditions is completed (STEP S102; Yes), the CPU 11 determines whether overflow occurs or not in a case where a plurality of processing conditions, which shows the setting contents of the past job, is displayed on the job history display area 52 of the history screen 50 with a display configuration set up for each job (STEP S103 (refer to FIG. 22)).

In a case where overflow occurs (STEP S103; Yes), the CPU 11 executes a rounding process by a subroutine (STEP S104). Then, the display processing is executed by the subroutine (STEP S105), and this processing ends (End). In a case where overflow does not occur (STEP S103; No), the CPU 11 executes the display processing by the subroutine (STEP S105), and this processing ends (End).

FIG. 24 illustrates a rounding process (sub processing) in the above-mentioned job history display processing (main processing). When starting this sub processing, the CPU11 refers to the priority table corresponding to the authenticated user memorized in the nonvolatile memory 15. This determines the priority for changing display into the icon display configuration for each processing condition to be displayed for the job in which overflow occurs (STEP S111 (refer to FIG. 22)). Then, changing display into the icon display configuration is performed from the high priority processing condition (STEP S112).

In a case where overflow still occurs after the change of display (STEP S113; Yes), the process returns to STEP S112. In STEP S112 of the second time onward, the CPU 11 performs the change of display into the icon display configuration for the highest priority processing condition among the processing conditions, which have not been changed. In a case when overflow stops occurring (STEP S113; No), this processing will be ended and the process will return to the main processing (Return).

FIG. 25 illustrates display processing (sub processing) in the above-mentioned job history display processing (main processing). When this sub processing is started, the CPU 11 will display the history screen 50, onto which the job history in a past of an authenticated user is displayed on the operation display section 16 (STEP S121). Here, the history screen 50 of the display configuration and the conversion specification shown in FIG. 10 is displayed.

In detail, in the main processing, the CPU 11 reads display data corresponding to the display configuration of each processing condition to be displayed based on the setting contents information of the job that corresponds to the authenticated user and is read out from the job history table 30 (refer to FIG. 2). The CPU 11 creates a table for a display in a work area of the RAM 14 using the display data. In creating this table for the display, the above-mentioned display data is arranged in the order of the latest execution time to the earliest execution time from the top to the bottom and registered in a job unit based on the execution time information of each job read out from the job history table 30 in the main processing. The CPU 11 uses this table for the display and displays the history screen 50, which displayed the history of the job in a past of the authenticated user, on the operation display section 16. In this display, all or a plurality of processing conditions, which show the setting contents of a job, will be arranged to be displayed in the job history display area 52.

Then, when the CPU 11 receives the pressing of a display configuration conversion request button 57 on the history screen 50 (STEP S122; Yes) (display configuration conversion key ON)), the CPU 11 monitors the selection of a processing condition in a job displayed on the history screen 50, and the selection of a display configuration (the detailed character display button 58a/simplified character representation button 58b/icon display button 58c being pressed) (STEP S123; No—loop of STEP S123).

When having received the selection, the CPU 11 will convert a display configuration of the selected processing conditions into a selected display configuration (display configuration corresponding to a pressed display button) (STEP S124). Then, the CPU 11 rewrites the display configuration information corresponding to the processing conditions of the relevance memorized in the display configuration table 40 to the changed (selected) display configuration information, ends this processing and returns to the main processing (Return).

Thus, according to this embodiment of the present invention, in a case where a plurality of processing conditions to be displayed cannot be entirely displayed with the display configuration (character display configuration) corresponding to each job onto the job history display area 52 or new job setting verification area 53 in the history screen 50, a change to make the display configuration of the processing conditions into other display configurations (icon display configuration), which make the display size small for equal to or more than one processing condition determined based on the predetermined conditions (priority order) out of the plurality of processing conditions to be displayed is made so that all of the processing conditions can be display. Thereby, even in a case where the display area is restricted, all or many of the processing conditions to be displayed can be legibly displayed so that it may be easy to understand. Since all or many of the processing conditions to be displayed can be verified at once without switching or scrolling the screen to be displayed, operability and visibility will be improved.

FIG. 15 describes a case where the prioritization of the processing conditions, which changes the display configuration into the icon display configuration, is performed based on the comparison of the recognizability at the time of displaying a plurality of processing conditions to be displayed with the icon display configuration. In this case, the processing conditions whose display configuration has been changed is arranged to be determined based on this priority.

FIG. 16 describes a case where the prioritization of the processing conditions, which changes the display configuration into the icon display configuration, is performed based on the comparison of the display size at the time of displaying a plurality of processing conditions to be displayed with the icon display configuration. In this case, the processing conditions whose display configuration has been changed is arranged to be determined based on this priority. As described above, instead of this display size, it is possible to perform the prioritization of the processing conditions, which performs the above-mentioned change based on the comparison of the shortened amount or the shortening rate of the display size.

FIGS. 17-21 described a case where a user registered the priority order (setting change). In this case, the user arbitrarily determines the priority of the processing conditions, which performs the above-mentioned change, and can register the priority order. And it becomes possible that a user's needs can be satisfied now.

FIG. 22 described a case where the priority order was determined based on the usage history (use frequency/number of times of use) and functional importance (the flexibility/name recognition) of processing conditions. Processing conditions whose display configuration has been changed come to be determined in this case based on this priority.

As stated above, although embodiments of the invention have been described using drawings, concrete structures are not limited to what was shown in the embodiments. Although various changes and additions may be made without departing from the scope of the present invention, they will be included in the present invention.

For example, in the multi function peripheral 10 related to the first and the second embodiments, the history screen 50 for displaying a history of a job is arranged to have a function of a setting screen for setting up a job and a confirmation screen for verifying the setting contents of a job. The first and the second embodiments have been explained using a case where the processing conditions of a job displayed on the job history display area 52 and the new job setting verification area 53, which were provided in this history screen 50, are to be objectives of the embodiments. However, it will be acceptable to set the processing conditions of a job displayed on a setting screen or on a confirmation screen independently displayed from the history screen as objectives.

The algorithm, which determines processing conditions whose display configuration has been changed explained in the second embodiment, is not limited to what was explained in FIG. 22. For example, with respect to the functional importance that the manufacturer sets, the weight factor may be put on the functional importance based on the comparison of the recognizability of the icon display configuration explained in FIG. 15 other than putting the weight factor for every processing condition based on the classification of the basic function and the application function explained in FIG. 22. Without using the functional importance, only the usage history (use frequency and/or the number of times of use) of a user may be used. Or, an algorithm for obtaining a calculation value by putting the weight factor for every processing condition based on the comparison of display size in the icon display configuration, the shortened amount and a shortening rate explained in FIG. 15 and the combination of them may be used. Display history (display frequency and the number of times of the display) of the display configuration in the processing conditions may be used. With respect to this display history, for example, with respect to the plurality of the processing conditions to be displayed, it is possible to compare the display frequency and/or the number of times of the display in the character display configuration, and to change the display configuration into the icon display configuration with priority from those high priorities.

In FIG. 22, the processing conditions whose display configuration will be changed (candidate for an icon display) are determined based on the priority order for changing the display configuration, the sum total display size (S1) of the plurality of processing conditions for the display in a job and display area size (S). However, the processing conditions to be changed may be determined corresponding to whether the calculation value ($\gamma$) is equal to or more than a predetermined determining value (K) instead of these conditions. For example, in the example shown in FIG. 22, in a case where the processing conditions whose determining value is set as (K)=10 and the calculation value ($\gamma$) is more than the determining value (K), change the display configuration into a candidate for an icon display. Processing conditions A in which the calculation value ($\gamma$)=15, processing conditions H in which calculation value ($\gamma$)=16.8, and processing conditions I in which calculation value ($\gamma$)=21.6 are arranged to determined as candidates for an icon display.

In the multi function peripheral 10 related to an embodiment, the touch-sensitive operation display section 16 has a function of an operation section and a display section. However, this operation section and display section may be individually configured. The printer section 22 in the multi function peripheral 10 may also be a printer of other systems, such as an LED printer, which performs scanning and exposure of the photoreceptor drum by LED (Light Emitting Diode) instead of the laser beam.

The present invention is applicable not only to a multi function peripheral explained in embodiments but also other information processing apparatus, such as a copying machine.

What is claimed is:

1. An information processing apparatus comprising:
a display section;
a selection section which receives a selection of a processing condition of a job from a plurality of processing conditions, and a selection of a display configuration for expressing the selected processing condition from a plurality of types of display configurations, the display configuration being a first character display configuration, a second character display configuration which expresses the processing condition in characters more briefly than the first character display configuration, or an icon display configuration which expresses the processing condition in an icon, wherein the processing condition of a job is a process condition for executing a function included in the job;

a memory section which memorizes, by each processing condition of a job, the plurality of types of display configurations for displaying each processing condition on the display section, and memorizes, by each processing configuration of the job, one display configuration having been selected from the plurality of types of display configurations through the selection section and set by being correlated with the each processing condition; and a control section which correlates the selected display configuration with the processing condition selected through the selection section, and controls to memorize the selected display configuration correlated with the processing condition into the memory section, and controls to display the plurality of processing conditions in one screen on the display section by utilizing, for each of the plurality of processing conditions, said one display configuration having been correlated with each processing condition and memorized in the memory section.

2. The information processing apparatus of claim 1, wherein the icon display configuration comprises a first icon display configuration which expresses one processing condition with one icon, and a second icon display configuration which expresses a combination of two or more of the processing conditions with one icon.

3. The information processing apparatus of claim 1, wherein the selection section receives, by each user, the selection of the processing condition, and the selection of the display configuration for the selected processing condition, and the control section, by each user, correlates the selected display configuration with the processing condition selected through the selection section, and controls to memorize the selected display configuration correlated with the processing condition into the memory section.

4. The information processing apparatus of claim 1, wherein display sizes of at least two types of display configurations among the plurality of types of display configurations corresponding to one of the plurality of processing conditions are different from each other, wherein in cases where the display section displays the plurality of processing conditions in a predetermined display area in one screen displayed on the display section, the control section determines whether it is possible or not to display all of the plurality of processing conditions to be displayed in the predetermined display area with the corresponding display configuration memorized in the memory section, and in cases where the control section determines it to be not possible, the control section changes the display configuration to another display configuration among the plurality of types of display configurations memorized in the memory section for making a display size smaller, so as to be capable of displaying all of the plurality of processing conditions to be displayed in the predetermined display area, with respect to one or more processing conditions which has been determined out of the plurality of processing conditions to be displayed, based on a predetermined condition.

5. The information processing apparatus of claim 4, wherein the predetermined condition is a comparison of recognizability of the display configurations in cases of displaying the plurality of processing conditions to be displayed, by using the another display configuration for making a display size smaller.

6. The information processing apparatus of claim 4, wherein in cases where the display configuration to be changed to another display configuration for making a display size smaller, the control section determines it based on a prescribed priority order, wherein the prescribed priority order is set such that, by comparing display sizes in cases of displaying the plurality of processing conditions to be displayed with other display configurations for making the display size smaller, the priority order of the processing condition that makes the smaller display size becomes the higher priority order.

7. The information processing apparatus of claim 4, wherein in cases of determining the display configuration to be changed to another display configuration for making a display size smaller, the control section determines it based on a prescribed priority order, wherein the prescribed priority order is set such that, by comparing shortening rates in cases of displaying the plurality of processing conditions to be displayed with other display configurations for making a display size smaller, the priority order of the processing condition that makes the larger shortening rate becomes the higher priority order.

8. The information processing apparatus of claim 4, wherein in cases of determining the display configuration to be changed to another display configuration for making a display size smaller, the control section determines it based on a prescribed priority order, wherein the information processing apparatus further comprises a registration section, which receives a registration of a priority order of the processing conditions for which the display configuration is changed, wherein the prescribed priority order is the priority order registered through the registration section.

9. The information processing apparatus of claim 4, wherein said one screen is a setting screen for setting up the processing condition of the job.

10. The information processing apparatus of claim 4, wherein said one screen is a confirmation screen for confirming the processing condition set up for the job.

11. The information processing apparatus of claim 4, wherein said one screen is a history screen for displaying a history of the job.

12. The information processing apparatus of claim 4, wherein in cases of determining the display configuration to be changed to another display configuration for making a display size smaller, the control section determines it based on a prescribed priority order, wherein the prescribed priority order is set such that, by comparing usage histories of the plurality of processing conditions to be displayed in a past, the priority order of the processing condition of the higher usage histories becomes the higher priority order.

13. The information processing apparatus of claim 12, wherein the usage histories comprise a use frequency and a number of times of use.

* * * * *